US010045522B2

(12) United States Patent
Clarke et al.

(10) Patent No.: US 10,045,522 B2
(45) Date of Patent: Aug. 14, 2018

(54) INSECTICIDE SPRAYER AND NOZZLE ASSEMBLY

(71) Applicant: CLARKE MOSQUITO CONTROL PRODUCTS, INC., St. Charles, IL (US)

(72) Inventors: Frank Clarke, Palatka, FL (US); Grifith Lizarraga, Homestead, FL (US); Daniel Fachet, Addison, IL (US)

(73) Assignee: CLARKE MOSQUITO CONTROL PRODUCTS, INC., St. Charles, IL (US)

( * ) Notice: Subject to any disclaimer, the term of this patent is extended or adjusted under 35 U.S.C. 154(b) by 0 days.

(21) Appl. No.: 15/681,019

(22) Filed: Aug. 18, 2017

(65) Prior Publication Data

US 2018/0064091 A1 Mar. 8, 2018

Related U.S. Application Data

(60) Provisional application No. 62/515,888, filed on Jun. 6, 2017, provisional application No. 62/414,119, filed on Oct. 28, 2016, provisional application No. 62/409,745, filed on Oct. 18, 2016, provisional application No. 62/382,995, filed on Sep. 2, 2016.

(51) Int. Cl.
*A01M 7/00* (2006.01)

(52) U.S. Cl.
CPC .......... *A01M 7/0014* (2013.01); *A01M 7/006* (2013.01); *A01M 7/0071* (2013.01); *A01M 7/0082* (2013.01)

(58) Field of Classification Search
CPC .. A01M 7/0014; A01M 7/006; A01M 7/0071; A01M 7/0082; A01M 7/0089; B05B 7/0075
See application file for complete search history.

(56) References Cited

U.S. PATENT DOCUMENTS

| | | | | |
|---|---|---|---|---|
| 2,220,082 A * | 11/1940 | Daugherty | A01M 7/0014 | 239/513 |
| 2,661,239 A * | 12/1953 | Tirrell | A01M 7/0014 | 239/172 |

(Continued)

FOREIGN PATENT DOCUMENTS

| | | |
|---|---|---|
| GB | 729299 | 5/1955 |

OTHER PUBLICATIONS

"AU4000 A Rotary Atomiser for Ultra Low Volume Spraying", Micron Group, accessed on Apr. 27, 2017 (2 pages).

(Continued)

*Primary Examiner* — Christopher Kim
(74) *Attorney, Agent, or Firm* — Michael Best & Friedrich LLP

(57) ABSTRACT

A fluid sprayer includes a tank containing fluid therein and a nozzle assembly in communication with the tank to receive fluid therefrom and to atomize the fluid. The fluid sprayer also includes a blower assembly positioned upstream of the nozzle assembly for dispersing the atomized fluid from the nozzle assembly into the surroundings of the fluid sprayer and a discharge chute positioned downstream of the blower assembly into which the atomized fluid from the nozzle assembly is sprayed before being discharged upward and into the surroundings of the fluid sprayer.

24 Claims, 21 Drawing Sheets

(56) References Cited

U.S. PATENT DOCUMENTS

| | | | | | |
|---|---|---|---|---|---|
| 2,667,717 | A | | 2/1954 | Daugherty | |
| 4,172,557 | A | * | 10/1979 | Davis | A01M 7/0014 239/77 |
| 5,921,019 | A | * | 7/1999 | Baek | A01M 7/0014 239/77 |
| 6,223,995 | B1 | * | 5/2001 | Evans | A01G 13/065 239/14.1 |
| 6,742,718 | B2 | * | 6/2004 | Doebler | A01M 7/0003 239/147 |
| 9,027,851 | B2 | | 5/2015 | Omiatek et al. | |

OTHER PUBLICATIONS

"AU5000 An Efficient Rotary Atomiser for Aerial Spraying", Micron Group, accessed on Apr. 27, 2017 (2 pages).
"AU6539 A Versatile Electric Atomiser for Use on Helicopters", Micron Group, accessed on Apr. 27, 2017 (2 pages).
"CSM3 Turbine Vector Sprayer/Duster for Barrier Spraying, Larviciding, Odor Control & Insect Control", Buffalo Turbine, Jul. 22, 2016 (2 pages).
Micronair Atomiser Range for Helicopters (AU7000 & AU6539), Micron Group (http://www.microngroup.com/micronair_atomiser_range_for_helicopters), accessed on Apr. 27, 2017 (3 pages).
"Pro-Mist® Dura" Info Sheet, Clarke Mosquito Control Products, Inc., 2015 (2 pages).
International Search Report and Written opinion for Application No. PCT/US2017/049897 dated Jan. 18, 2018, 41 pages.

* cited by examiner

INSECTICIDE SPRAYER AND NOZZLE ASSEMBLY

FIELD OF THE INVENTION

The present invention relates to sprayers, and more particularly to nozzle assemblies used in insecticide sprayers.

BACKGROUND OF THE INVENTION

Insecticide sprayers are commonly mounted for transportation on a vehicle through a mosquito-infested region. Such sprayers atomize liquid insecticide for dispersal throughout the mosquito-infested region as the vehicle upon which the sprayer is mounted drives through the region.

SUMMARY OF THE INVENTION

The present invention provides, in one aspect, a fluid sprayer including a tank containing fluid therein and a nozzle assembly in communication with the tank to receive fluid therefrom and to atomize the fluid. The fluid sprayer also includes a blower assembly positioned upstream of the nozzle assembly for dispersing the atomized fluid from the nozzle assembly into the surroundings of the fluid sprayer and a discharge chute positioned downstream of the blower assembly into which the atomized fluid from the nozzle assembly is sprayed before being discharged upward and into the surroundings of the fluid sprayer.

The present invention provides, in another aspect, a method of operating a fluid sprayer. An airflow is generated through a discharge chute. A fluid selected from a group consisting of larvicide, adulticide, and a barrier repellent is pumped from a tank to a nozzle assembly. The fluid is atomized with the nozzle assembly. The atomized fluid is discharged into the discharge chute along a discharge axis oriented substantially perpendicular to a direction of the airflow exiting the discharge chute. The atomized fluid is sprayed from the discharge chute upward and into the surroundings of the fluid sprayer.

The present invention provides, in another aspect, a nozzle assembly for use with a fluid sprayer. The nozzle assembly includes a manifold connectable with a source of fluid and supportable by a discharge chute of the fluid sprayer and a plurality of nozzles in fluid communication with the manifold to receive fluid therefrom. Each of the nozzles has a discharge axis oriented substantially perpendicular to a direction of airflow exiting the discharge chute.

The present invention provides, in a further aspect, a fluid sprayer including a tank containing fluid therein and a nozzle assembly in communication with the tank to receive fluid therefrom. The nozzle assembly is operable to atomize the fluid. The fluid sprayer further includes a blower assembly positioned upstream of the nozzle assembly for dispersing the atomized fluid from the nozzle assembly into the surroundings of the fluid sprayer. An adjustable valve is positioned between the nozzle assembly and the tank to regulate the pressure of fluid supplied to the nozzle assembly. A controller is operable to vary the regulated fluid pressure by adjusting the valve in response to a speed at which the fluid sprayer is transported.

The present invention provides, in a another aspect, a method of operating a fluid sprayer including supplying a first fluid selected from a group consisting of larvicide, adulticide, and a barrier repellant to a nozzle assembly at a first regulated pressure. The first regulated pressure is changed to a second regulated pressure different than the first regulated pressure. A second fluid selected from the group is provided to the nozzle assembly at the second regulated pressure.

The present invention provides, in yet another aspect, a fluid sprayer including a tank containing fluid therein, a manifold in communication with the tank to receive fluid therefrom, and a blower assembly positioned upstream of the manifold for dispersing the fluid discharged from the manifold into the surroundings of the fluid sprayer. A first plurality of nozzles are connectable with the manifold to receive fluid therefrom and to discharge fluid from the manifold at a first volumetric flow rate. A second plurality of nozzles are connectable with the manifold to receive fluid therefrom and to discharge fluid from the manifold at a second volumetric flow rate different than the first volumetric flow rate. The first and second plurality of nozzles are interchangeable with the manifold to convert the fluid sprayer for use with a first fluid selected from a group consisting of larvicide, adulticide, and a barrier repellant and a second fluid selected from the group.

The present invention provides, in a further aspect, a method of operating a fluid sprayer including dispersing a first fluid selected from a group consisting of larvicide, adulticide, and a barrier repellant from the fluid sprayer with a first nozzle assembly at a first volumetric flow rate, replacing the first nozzle assembly with a second nozzle assembly, and dispersing a second fluid selected from the group from the fluid sprayer with the second nozzle assembly at a second volumetric flow rate different than the first volumetric flow rate.

The present invention provides, in another aspect, a fluid sprayer including a tank containing fluid therein, a manifold in communication with the tank to receive fluid therefrom, and a blower assembly positioned upstream of the manifold for dispersing the fluid discharged from the manifold into the surroundings of the fluid sprayer. A first plurality of nozzles are connectable with the manifold to receive fluid therefrom and are operable to discharge fluid from the manifold with a first spray pattern. A second plurality of nozzles are connectable with the manifold to receive fluid therefrom and are operable to discharge fluid from the manifold with a second spray pattern different than the first spray pattern. The first and second plurality of nozzles are interchangeable with the manifold to convert the fluid sprayer for use with a first fluid selected from a group consisting of larvicide, adulticide, and a barrier repellant and a second fluid selected from the group.

The present invention provides, in yet another aspect, a method of operating a fluid sprayer including dispersing a first fluid selected from a group consisting of larvicide, adulticide, and a barrier repellant from the fluid sprayer with a first nozzle assembly having a first spray pattern, replacing the first nozzle assembly with a second nozzle assembly, and dispersing a second fluid selected from the group from the fluid sprayer with the second nozzle assembly having a second spray pattern different than the first spray pattern.

The present invention provides, in yet another aspect, a method of operating a fluid sprayer including generating an airflow through a discharge chute, pumping a first fluid selected from a group consisting of larvicide, adulticide, and a barrier repellent from a fluid tank to a nozzle assembly, atomizing the first fluid with the nozzle assembly, discharging the atomized first fluid into the discharge chute, spraying the atomized first fluid from the discharge chute upward and into the surroundings of the fluid sprayer, disconnecting the fluid tank from a pump, connecting a flush tank to the pump, and pumping a second fluid selected from a group consisting of water and a cleaning solution from the flush tank to the nozzle assembly.

The present invention provides, in yet another aspect, a fluid sprayer including a tank containing fluid therein, and a rotary atomizer in communication with the tank to receive fluid therefrom and to atomize the fluid. The rotary atomizer includes a housing in fluid communication with the tank to receive fluid therefrom, a shaft supported by the housing for rotation about an axis, and a hub coupled to the shaft for co-rotation therewith, the hub including a plurality of apertures extending away from the axis from which atomized fluid is discharged. The fluid sprayer further includes a blower assembly positioned upstream of the nozzle assembly for dispersing the atomized fluid from the nozzle assembly into the surroundings of the fluid sprayer, and a discharge chute positioned downstream of the blower assembly into which the atomized fluid from the nozzle assembly is sprayed before being discharged into the surroundings of the fluid sprayer.

The present invention provides, in yet another aspect, a pesticide distribution unit including a tank containing granular pesticide therein, an auger in communication with the tank to receive granular pesticide therefrom, a blower assembly positioned upstream of the auger for dispersing the granular pesticide from the auger into the surroundings of the pesticide distribution unit, and a discharge chute positioned downstream of the blower assembly into which the granular pesticide is introduced before being discharged into the surroundings of the pesticide distribution unit.

The present invention provides, in yet another aspect, a pesticide distribution unit including a tank containing a liquid pesticide therein, the liquid pesticide selected from a group consisting of a liquid larvicide, a liquid adulticide, and a liquid barrier repellant, a nozzle assembly in communication with the tank to receive the liquid pesticide therefrom and to atomize the liquid pesticide, a container containing a granular pesticide therein, the granular pesticide selected from a group consisting of a granular larvicide, a granular adulticide, and a granular barrier repellant, an auger in communication with the container to receive the granular pesticide therefrom, a blower assembly positioned upstream of the nozzle assembly and the auger for dispersing the atomized liquid pesticide and/or the granular pesticide from the auger into the surroundings of the pesticide distribution unit, and a discharge chute positioned downstream of the blower assembly into which the liquid pesticide and/or granular pesticide is introduced before being discharged into the surroundings of the pesticide distribution unit.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
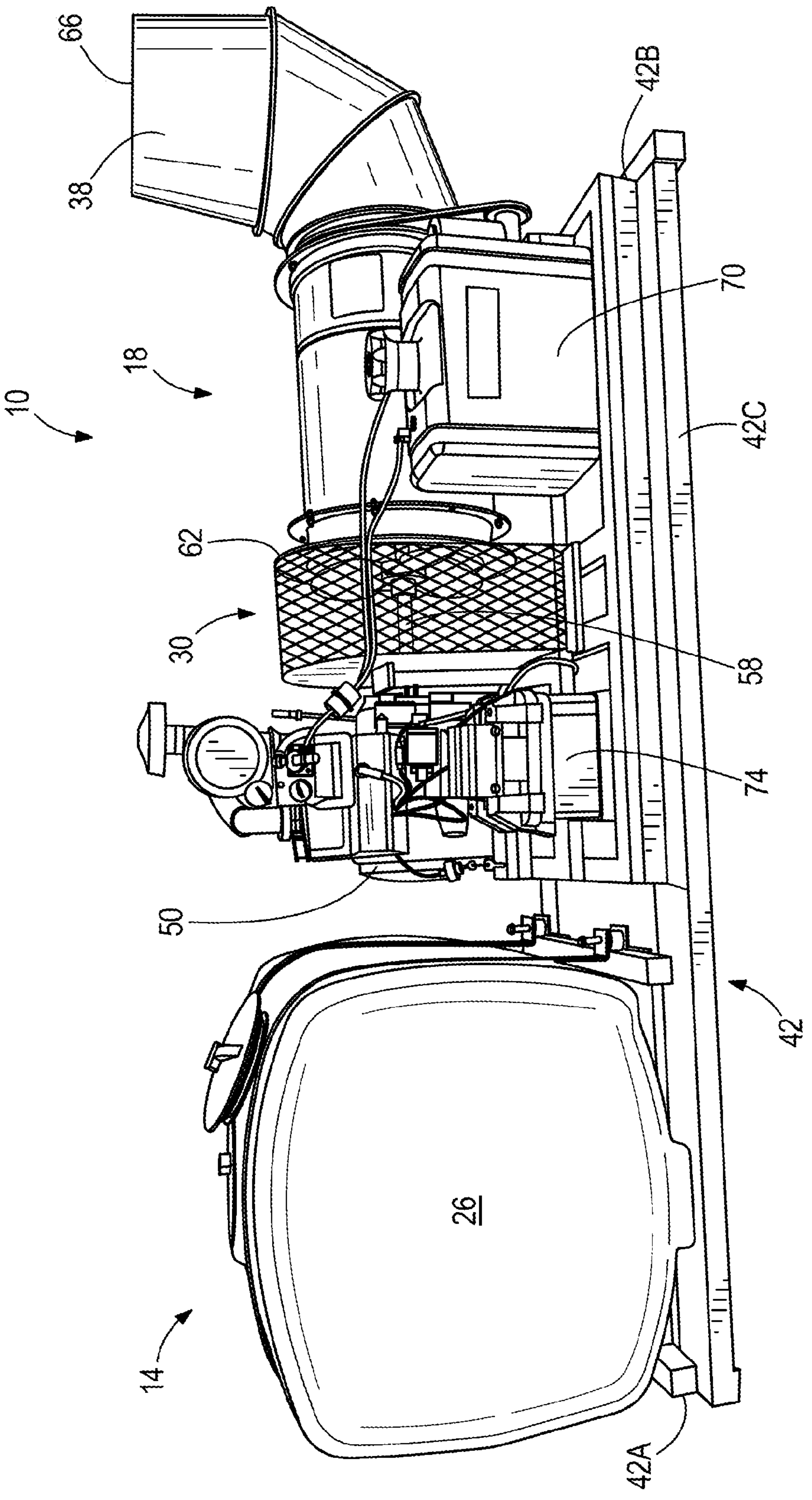
FIG. 1 is side view of a fluid sprayer in accordance with an embodiment of the invention.

FIG. 1 of the drawings illustrates a fluid sprayer 10 including a fluid storage module 14 and a dispersion module 18 in fluid communication with the fluid storage module 14 to receive fluid from the fluid storage module 14 and atomize the fluid. A pesticide, such as a liquid insecticide (e.g., a larvicide or adulticide) or a barrier repellant (e.g., a chemical pest barrier), is held in at least one tank 26 of the fluid storage module 14 and atomized by a nozzle assembly 22 in the dispersion module 18. Each of the larvicide, adulticide, and barrier repellant is sprayed at a different volumetric flow rate and pressure to achieve different droplet sizes measured a distance from the fluid sprayer 10. Alternatively, any of a number of different liquids may be held in the tank 26 for subsequent atomization and dispersal by the nozzle assembly 22. With continued reference to FIG. 1, the dispersion module 18 also includes a blower assembly 30 positioned upstream of the nozzle assembly 22 for dispersing the atomized fluid from the nozzle assembly 22 into the surroundings of the fluid sprayer 10. The dispersion module 18 further includes a discharge chute 38 to direct the flow of the atomized fluid from the fluid sprayer 10.

Figure 2:
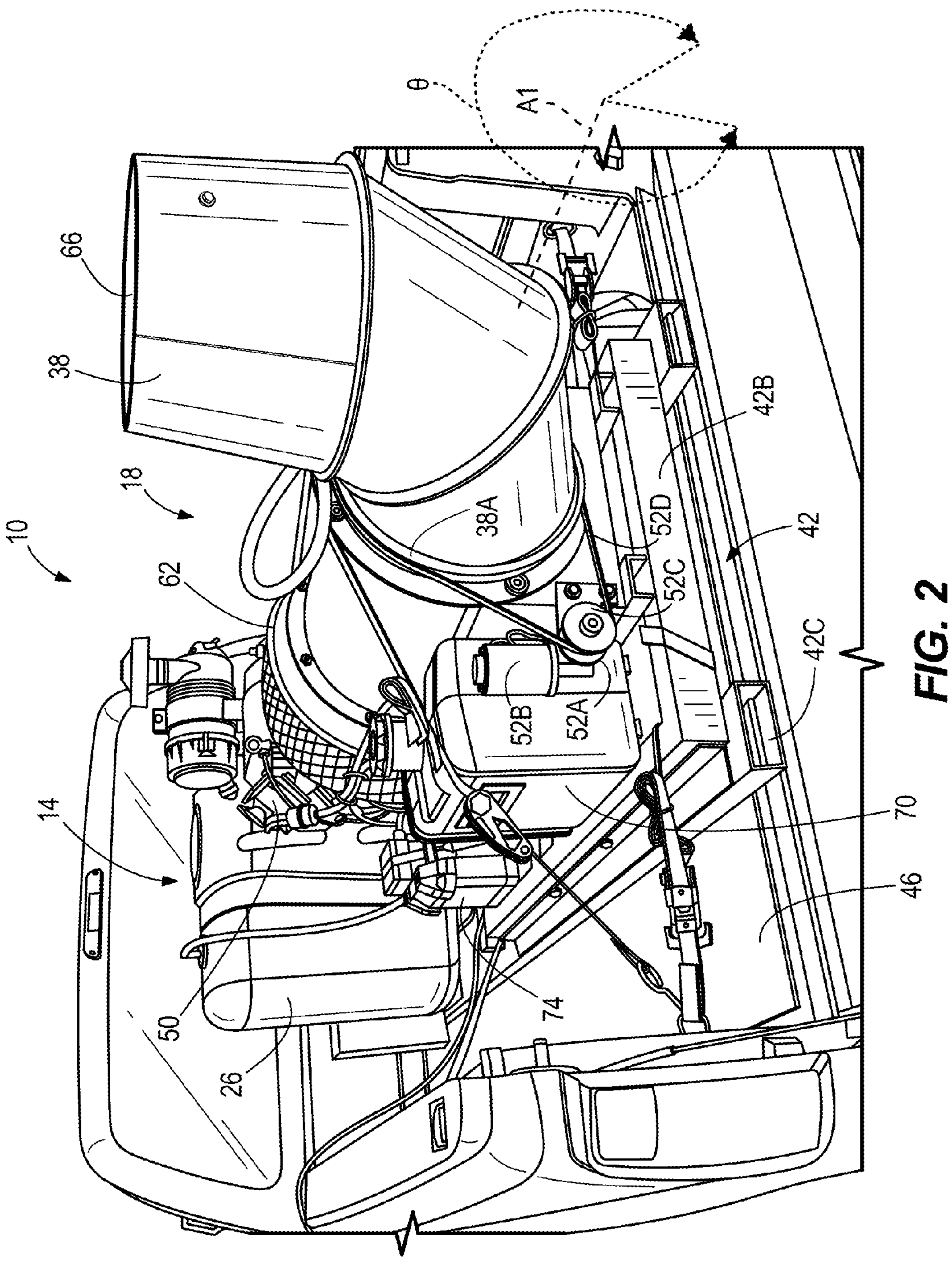
FIG. 2 is a perspective view of the fluid sprayer of FIG. 1 mounted on a truck bed.

Both of the fluid storage module 14 and dispersion module 18 are fixed to a frame 42 that may be mounted in a truck bed 46, as shown in FIG. 2, for transport and when in use. As shown, the frame 42 includes a first sub-frame 42A supporting the fluid storage module 14, a second sub-frame assembly 42B supporting the dispersion module 18, and a third sub-frame assembly 42C supporting the first two sub-frame assemblies 42A, 42B. The third sub-frame assembly 42C supports peripherals such as a water tank 528, a battery 74, and a fuel tank 70, each of which will be described in greater detail below. The frame 42 is comprised of steel rectangular tubing welded or otherwise fastened together. Specifically, the first sub-frame assembly 42A may be permanently secured to the third sub-frame assembly (e.g., by welding) and the second sub-frame assembly 42B may be bolted to the third sub-frame assembly 42C such that the dispersion module 18 is removable from the truck bed 46 without removing the entire frame 42.

The blower assembly 30 includes an engine 50 (e.g., a gasoline or diesel engine) and a turbine 54 driven by the engine 50. Alternatively, the engine 50 may be replaced with a different power unit (e.g., an electric motor). The turbine 54 includes fan blades affixed to a central hub, to which an output shaft 58 of the engine 50 is coupled. As the engine 50 drives the turbine 54, the fan blades rotate, producing a wind thrust having a speed of about 150 miles per hour or more. The turbine 54 is located at an upstream end 62 of the discharge chute 38 such that the wind thrust provided by the turbine 54 traverses the length of the discharge chute 38 from the upstream end 62 to a downstream end 66. A fuel tank 70 is mounted to the second sub-frame assembly 42B and supplies the engine 50 with fuel. A battery 74 is also mounted to the second sub-frame assembly 42B and provides electrical power to a starter for the engine 50 and additionally provides electrical power to a pumping system 78, as described in greater detail below.

Figure 7:
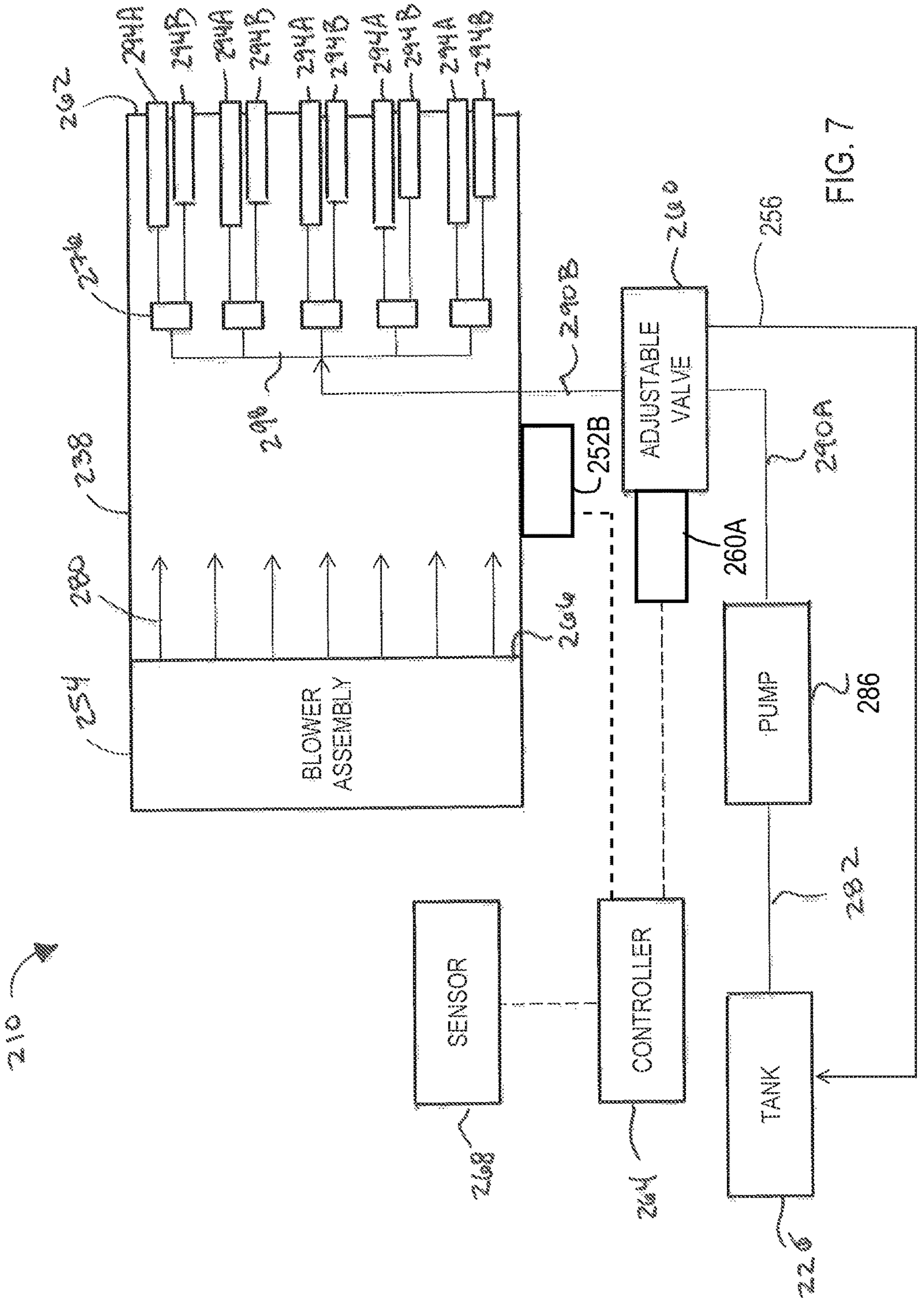
FIG. 7 is a schematic representation of a fluid sprayer in accordance with another embodiment of the invention.

A rotational mechanism 52A, as shown in FIG. 2, includes at least one pulley 52C and a belt 52D wrapped around the pulley 52C and the discharge chute 38. The belt 52D is positioned within a channel 38A in the chute 38 to rotably connect the pulley 52C to the chute 38. The rotational mechanism 52A is driven via an actuator, such as motor 52B. The motor 52B is activated by a controller (such as controller 264; FIG. 7) to rotate the pulley 52C and the belt 52D to rotate the chute 38 about axis A1 to angularly reorient the downstream end 66 of the chute 38 relative to the upstream end 62, relative to the frame 42, or relative to the bed 4 of the vehicle. The chute 38 is rotatable from a first position to a second position within an angular range θ which is, for example, approximately 180 degrees, 240 degrees, 270 degrees, 300 degrees, 330 degrees, or 360 degrees, centered about the vertical upward orientation illustrated in FIGS. 1 and 2.

The pumping system 78 includes a low-pressure supply line 82, pump 86, and a high-pressure supply line 90. The low-pressure supply line 82 transfers the fluid from the fluid storage tank 26 to the pump 86. As shown, the pump 86 is an electric diaphragm pump, though the pump 86 may alternatively be a mechanical pump (e.g., a mechanical piston-pump) driven by the engine 50. The pump 86 pressurizes the fluid from the low-pressure supply line 82 and transfers it to the high-pressure supply line 90, which terminates at the nozzle assembly 22.

Figure 3:
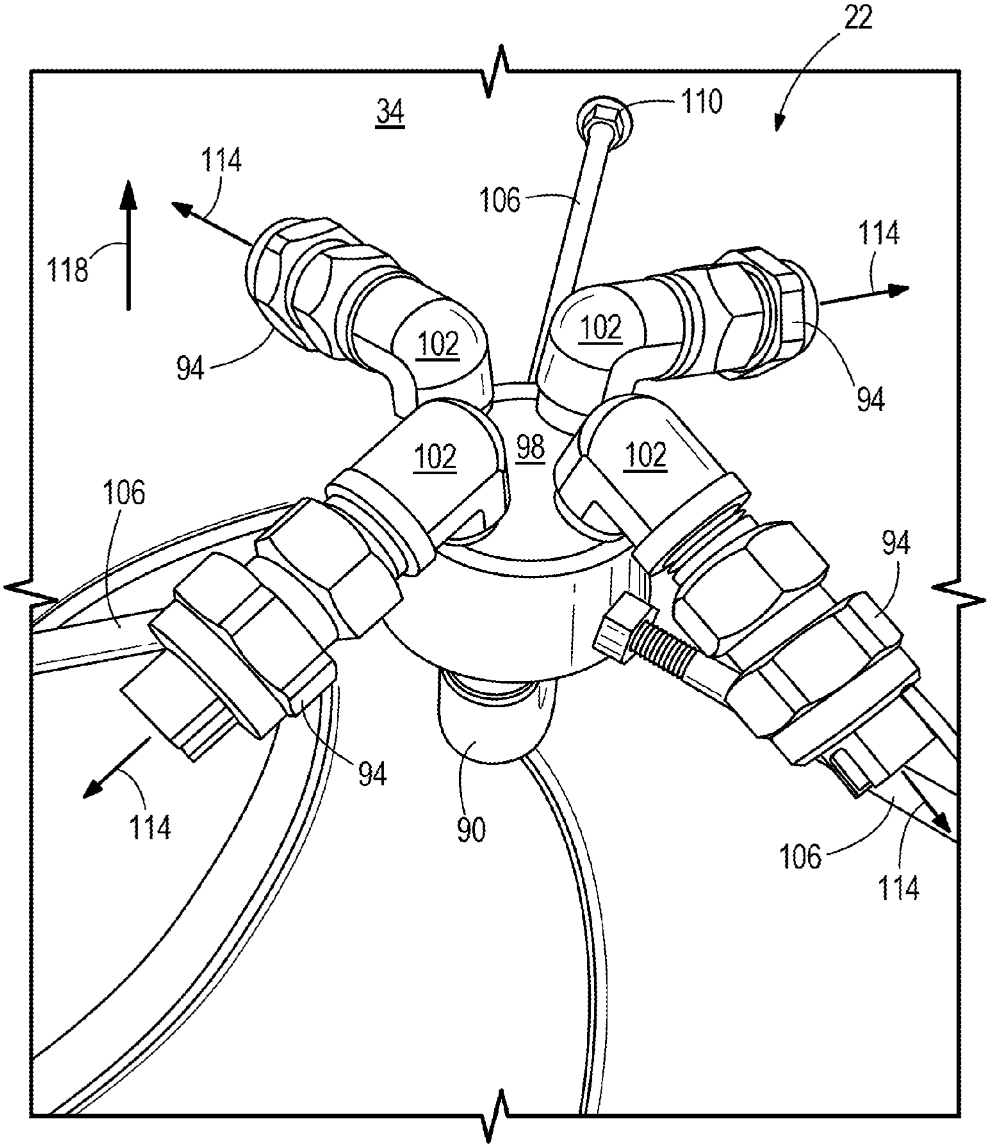
FIG. 3 is a perspective view of a nozzle assembly of the fluid sprayer of FIG. 1.

As shown in FIG. 3, the nozzle assembly 22 is located within the chute 38 between the upstream and downstream ends 62, 66. In the illustrated embodiment, the nozzle assembly 22 includes four nozzles 94, each of which is fixed to a shared manifold 98 by an L-shaped pipe 102 (i.e., forming a ninety degree angle). The manifold 98 is centrally located within the chute 38 and is supported within the chute 38 by radial support rods 106 extending between the manifold 98 and a sidewall 34 of the chute 38. The manifold 98 has a single inlet and one outlet for each nozzle 94). The high-pressure supply line 90 provides pressurized fluid to the inlet of the manifold 98, which is subsequently dispersed through the four outlets, through the L-shaped pipes 102, and out the nozzles 94. The fluid is atomized by the nozzles 94, entering the chute 38 and propelled by the wind thrust from the blower assembly 30. The wind thrust propels the atomized fluid from the downstream end 66 of the discharge chute 38 and away from the fluid sprayer 10.

Traditional directed larviciding, where the atomized spray is directed to the desired target (e.g., body of water, roadside, etc.), is accomplished by actuating the motor 52B to rotate the rotational mechanism 52A and the chute 38 to direct the downstream end 66 of the chute 38 toward the target. Vertical or urban larviciding, operable to create a high-rising mist, is accomplished by actuating the motor 52B and the rotational mechanism 52A to orient the downstream end 66 of the chute 38 in the vertical or upward orientation.

As shown in FIG. 3, in the illustrated embodiment of the nozzle assembly 22, the nozzles 94 may be "80 Series" nozzles used in mosquito sprayer applications with an 80 degree fan (i.e., the flow from the nozzle exits over an 80 degree angle). Further, the nozzles 94 may have a flow rate of, for example, 0.5 gallons per minute at 15 psi of pressure in the manifold 98, 0.4 gallons per minute at 25 psi of pressure, or 0.3 gallons per minute at 35 psi of pressure to achieve a flow rate of about 1.2 to 2.0 gallons per minute collectively from the nozzle assembly 22. The specific configuration of the nozzles 94 may be chosen based upon the different fluids (e.g., larvicide, adulticide, etc.) dispensed by the fluid sprayer 10. And, the nozzles 94 may be configured to emit a different spray pattern (e.g., a conical spray pattern), rather than a fan pattern. Further still, the nozzle assembly 22 may be replaced with a rotary atomizer such as the rotary spray head assembly described in U.S. Pat. No. 9,027,851 and issued on May 12, 2015, the entire contents of which are incorporated herein by reference.

Figure 4A:
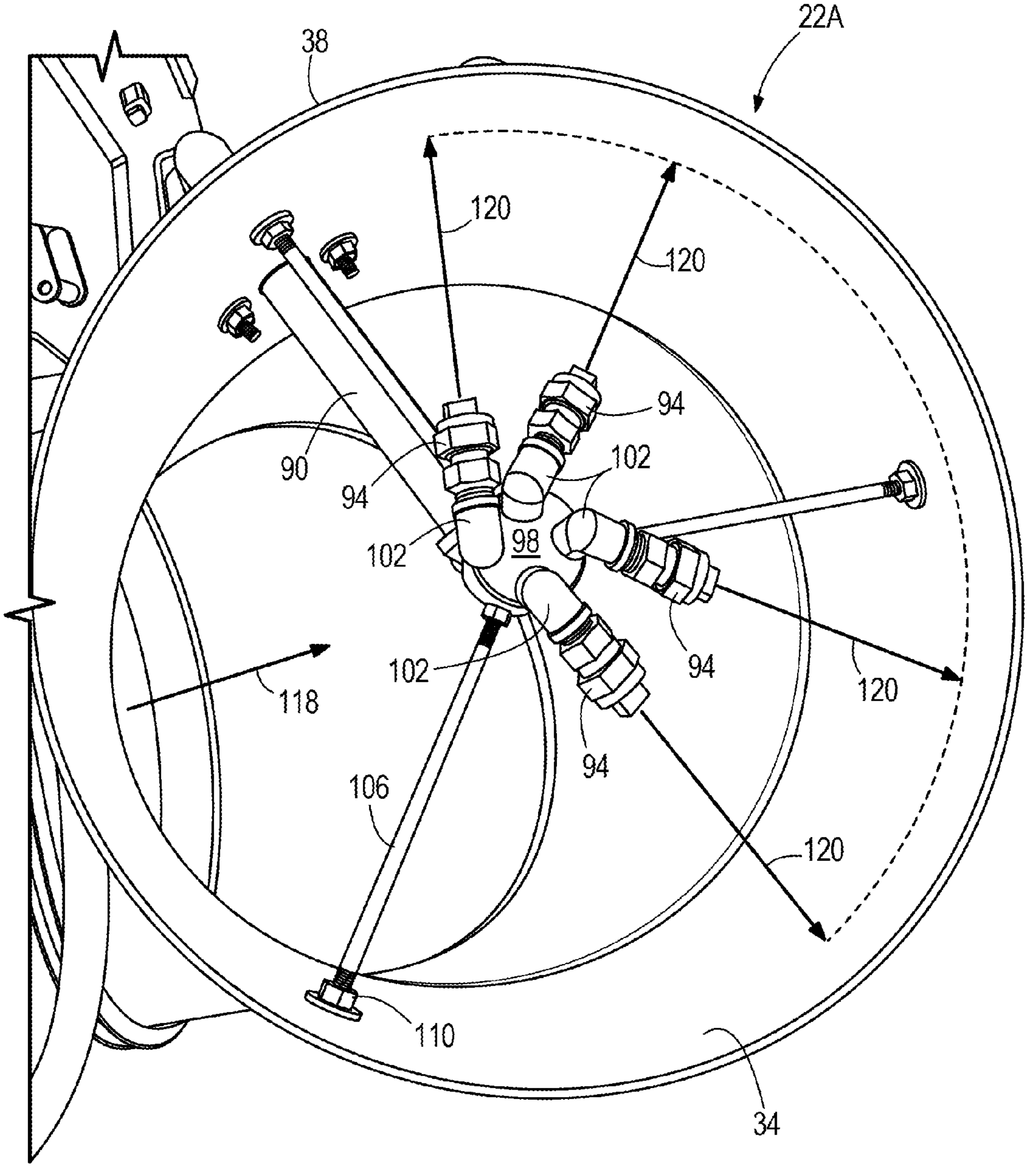
FIG. 4A is a top view of an alternative configuration of a nozzle assembly for use with the fluid sprayer of FIG. 1.
Figure 4B:
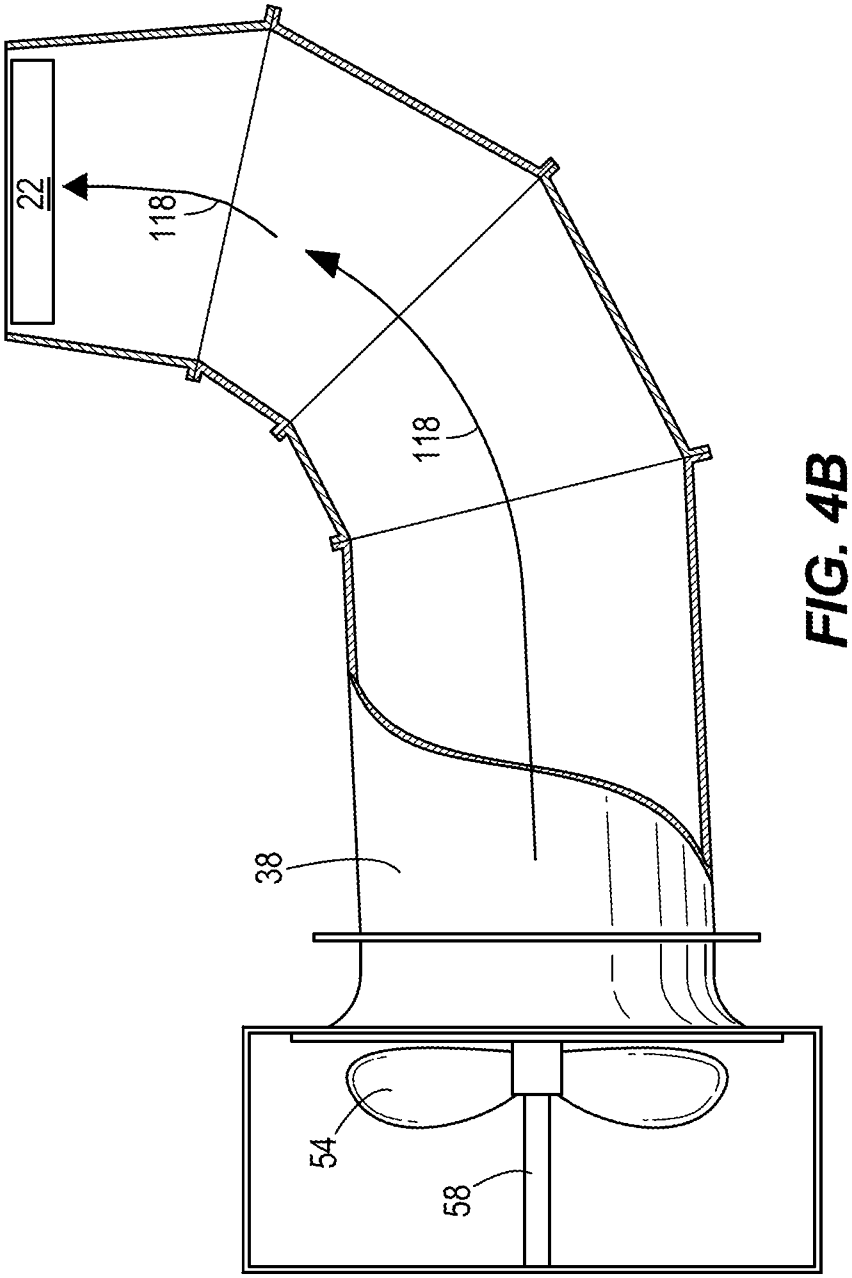
FIG. 4B is a partial cutaway side view of the fluid sprayer of FIG. 1 illustrating a wind thrust through the sprayer.

The atomized fluid is discharged from each of the nozzles 94 along a discharge axis (shown by arrows 114) in a direction that is substantially perpendicular to the direction of the wind thrust in the chute 38, as designated by arrow 118 (FIGS. 4A, 4B). In comparison to a nozzle arrangement in which the atomized fluid is directed parallel or near-parallel to the direction of wind thrust 118 (not shown), the nozzle assembly 22 shown in FIG. 3 yields atomized droplets of smaller size, thereby increasing the distance that the droplets may travel when discharged from the chute 38 without increasing the velocity of air from the blower assembly 30.

For example, in an alternative configuration of the nozzle assembly in which the nozzles are oriented parallel or near-parallel to the direction of wind thrust 118, droplet size of the atomized fluid may be a minimum of 400 microns. With the nozzle assembly 22 shown in FIG. 3, droplet size can be decreased to 300 microns when measured at a distance of 30 feet from the fluid sprayer 10 and 150 microns at a distance of 200 feet. Smaller droplets are carried further by the wind. So as the droplet size decreases, the effective range of the fluid sprayer 10 increases.

As shown in FIG. 4A, an alternative configuration of a nozzle assembly 22A is shown, with like components being shown with like reference numerals. In the nozzle assembly 22A, the L-shaped pipes 102 are rotated relative to the manifold 98 to redirect the output flow of the nozzles 94. The chute 38 includes a 90-degree bend, redirecting the air stream (as shown by arrow 118) discharged from the turbine 54 from a horizontal stream to a vertical stream. The bend creates a high-velocity region in which the velocity of the air in the chute is greater compared to an adjacent low-velocity region. The high-velocity region is located along an outer edge of the vertical portion of the chute 38, opposite the horizontal portion of the chute 38. The velocity of air within the chute 38 decreases along a gradient to the low-velocity region located within the vertical portion of the chute 38, opposite the high-velocity region.

To capitalize on the higher velocities of the wind thrust within the high-velocity region, the nozzles of the nozzle assembly 22A are reoriented to spray exclusively into the higher velocity region in a direction substantially perpendicular to the wind thrust 118 passing the nozzle assembly 22A (as illustrated by arrows 120). The higher speeds impart a greater shear force on the atomized droplets discharged from the nozzles 94, further reducing their size and increasing the effective range of the fluid sprayer 10. Further, directing the nozzles 94 exclusively toward the high-velocity region (and away from low-velocity region) prevents droplets from accumulating on the sidewall 34 of the chute 38, which would exit the chute 38 as large droplets.

Figure 5:
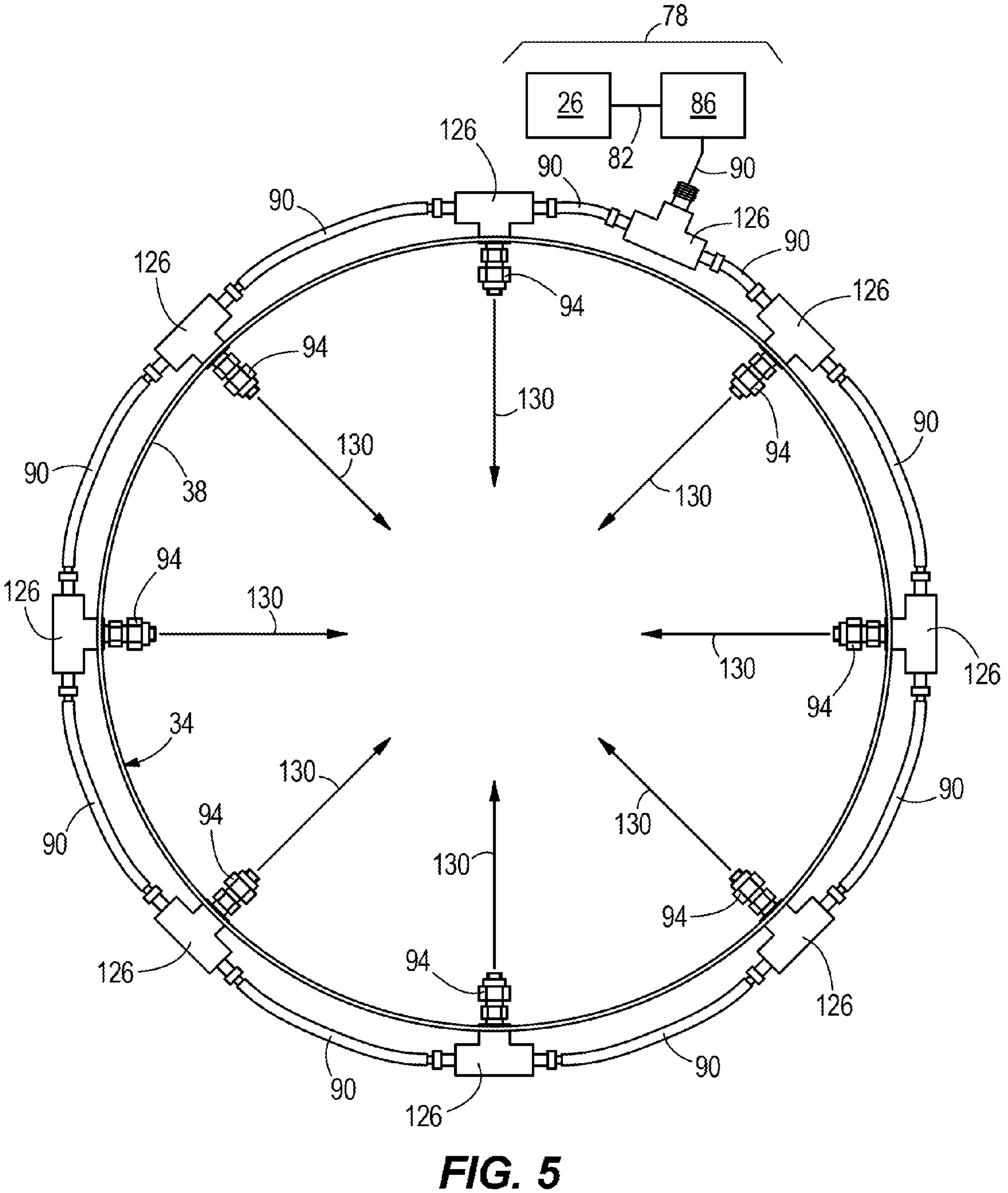
FIG. 5 is a schematic top view of another alternative configuration of a nozzle for use with the fluid sprayer of FIG. 1.

As shown in FIG. 5, another alternative configuration of a nozzle assembly 122 is shown, with like components being shown with like reference numerals. Rather than being located in the interior of the discharge chute 38, the nozzle assembly 122 is positioned outside or along a periphery of the exterior of the chute 38. Eight nozzles 94 are equally spaced about the periphery of the chute 38, fluidly connected to one another and to the pump 86 via T-pipes 126 and high-pressure lines 90. Alternatively, fewer than eight nozzles 94 (seven, for example) may be used in the nozzle assembly 122. The arrangement of T-pipes 126 provides a circuitous path for the fluid in the high-pressure lines 90 to reach all nozzles 94. The nozzles 94 extend through openings in the sidewall 34 of the chute 38 such that the atomized fluid (as illustrated by arrows 130) is introduced perpendicular to the wind thrust 118, affording at least the same benefits outlined with respect to the nozzles 94 shown in FIG. 3. Alternatively, the nozzles 94 may be disposed outside the chute 38 adjacent the downstream end 66 of the chute 38. Further, because the nozzles 94 discharge the atomized fluid radially inward, the distance between the outlet of each of the nozzles 94 and the sidewall 34 of the chute 38 is greatly increased (compared to either of the nozzle assemblies 22, 22A), limiting the amount of droplets accumulating on the sidewall 34 of the chute 38.

Figure 6:
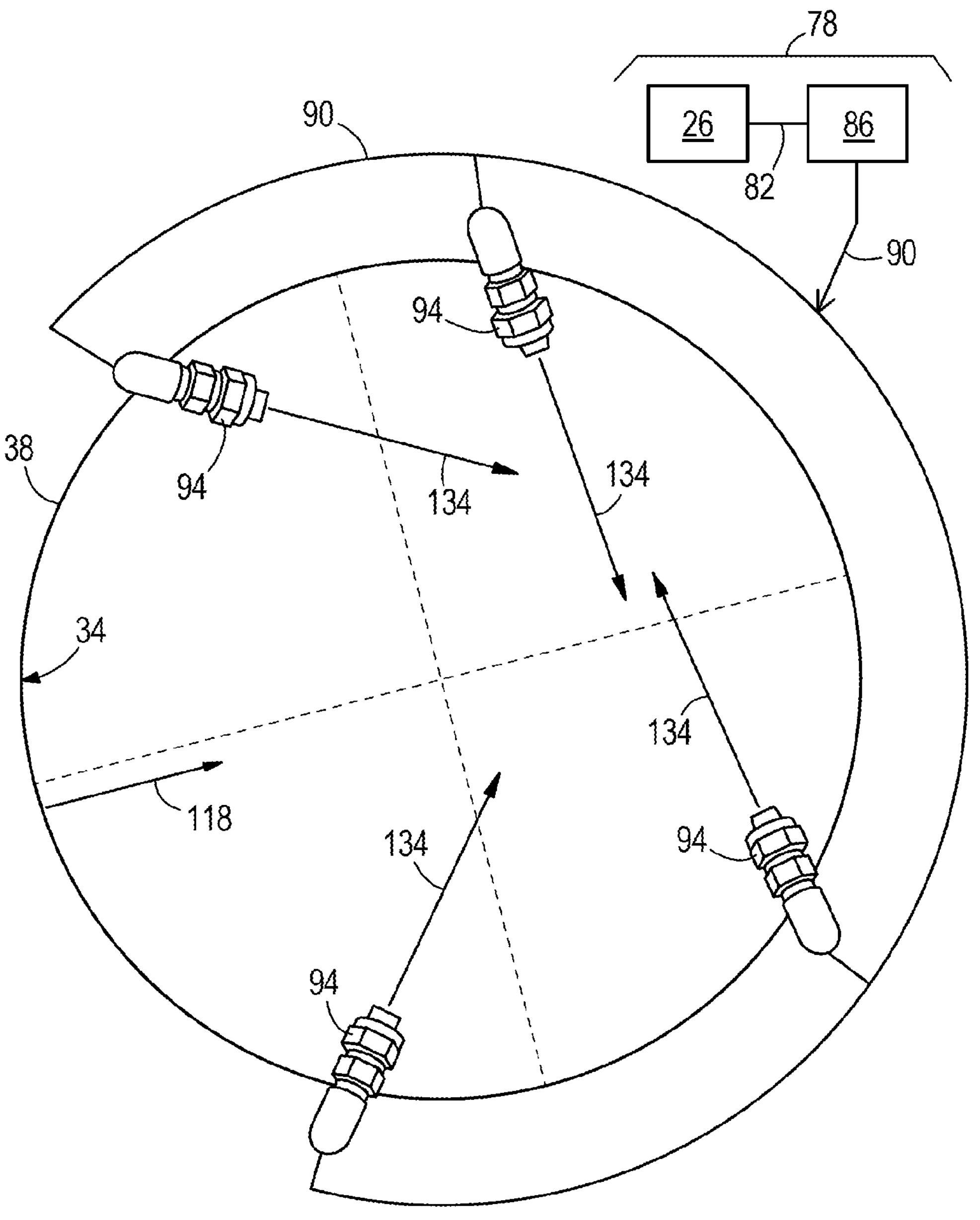
FIG. 6 is a schematic top view of yet another alternative configuration of a nozzle assembly for use with the fluid sprayer of FIG. 1.

As shown in FIG. 6, the nozzles 94 may be located at the outer periphery of the chute 38, similar to the nozzles 94 shown in FIG. 5, and may be directed towards the high-velocity region (or away from the low-velocity region) similar to the nozzles 94 shown in FIG. 4A. The directional flow of fluid is illustrated by arrows 134.

As shown schematically in FIG. 7, a fluid sprayer 210 includes a fluid storage tank 226, an apparatus for increasing fluid pressure such as a pump 286, a blower assembly 254, a nozzle manifold 298, and a plurality of nozzles 294A, 294B. Although only five of each of the nozzles 294A, 294B are schematically illustrated in FIG. 7, the fluid sprayer 210 may alternatively include more or fewer of each of the nozzles 294A, 294B (e.g., seven of each of the nozzles 294A, 294B). Further, although schematically shown elongated in a specific direction, this is not an indication of a particular orientation of the nozzles 294A, 294B. The fluid sprayer 210 functions similarly to the fluid sprayer 10 shown in FIGS. 1-6, except as otherwise noted. Like elements are labeled with like reference numerals incremented by 200.

An inlet of the pump 286 receives fluid (e.g., larvicide, adulticide, barrier repellant) from the storage tank 226 via the low-pressure line 282. The pump 286 may be a high pressure, high volume pump run at a constant speed to provide a constant pressure output. An outlet of the pump 286 discharges the fluid at a high pressure into a high-pressure line 290A, 290B. An adjustable pressure-regulating valve 260 is located within the high-pressure line 290A, 290B, dividing the high-pressure line into an upstream line 290A between the pump 286 and the adjustable valve 260 and a downstream line 290B between the adjustable valve 260 and the nozzle manifold 298. The adjustable valve 260 is operable to open or close between a fully open position and a fully closed position, including a number of positions therebetween. Therefore, the valve 260 is operable to supply fluid to the downstream line 290B and the manifold 298 at a regulated (i.e., constant) pressure and volumetric flow rate. A return line 256 interconnects a return port of the valve 260 to the tank 226 to return fluid not discharged to the downstream line 290B to the tank 226. Alternatively, the high-pressure line 290A, 290B may be directly connected to the manifold 298 and the valve 260 positioned downstream of the manifold 298 to supply fluid to the manifold 298 at a regulated pressure and volumetric flow rate.

As shown, a controller 264 is in electrical communication with an electrical actuator 260A of the valve 260 that, when actuated, varies the position of the valve 260 to a desired open/closed percentage based on input from a sensor 268. Such a controller 264 may be, for example, the SMARTFLOW II controller available from Clarke Mosquito Control Inc. of Roselle, Ill., United States of America. For example, the sensor 268 may measure and relay a speed of the vehicle (FIG. 2) on which the sprayer 210 is located using GPS data. It may be desirable to increase or decrease the regulated fluid pressure and/or the volumetric flow rate of the fluid to increase or decrease the amount of fluid sprayed by the nozzles 294A, 294B to account for an increasing or decreasing vehicle speed, respectively. Alternatively, the sensor 268 may measure air speed from the blower assembly 230, droplet size from the nozzles 294A, 294B, and/or type of fluid within the high-pressure line 290A, 290B to determine whether the fluid pressure within the downstream line 290B should be increased or decreased.

The controller 264 is in further electrical communication with the actuator 252B of the rotational mechanism (similar to rotational mechanism 52A; FIG. 2). Therefore, the actuator 252B may rotate the chute 238 based on GPS data or based on user input from an operator (e.g., remotely or within the vehicle). The controller 264 may send a signal to the actuator 252B to rotate the chute 238, for example, when switching between directed larviciding and vertical larviciding, or when the target of directed larviciding is changed, or when the vehicle makes a turn.

From the manifold 298, the fluid is divided amongst the plurality of nozzles 294A, 294B. As shown, the manifold 298 divides the flow from the single high-pressure line 290B to five valves 276. Each valve 276 directs the high-pressure flow to either a first nozzle 294A or a second nozzle 294B. The valves 276 may be two-position valves. In a first position, the valve 276 directs the fluid flow to the first nozzle 294A. In a second position, the valve 276 directs the fluid flow to the second nozzle 294B. Alternatively, the valve 276 may be a three-position valve including the two positions mentioned above and further including a third position in which neither valve 294A, 294B receives the fluid flow. Utilizing a three-position valve for the valve 276 allows the number of nozzles 294A, 294B to be increased or decreased without physically removing any of the nozzles 294A, 294B from the discharge chute 238. The number of nozzles may be greater or less than that shown. Also, the nozzles 294A, 294B may be oriented relative to a discharge chute 238 and an airstream 280 as shown in any of FIGS. 3-6. The first nozzles 294A may differ from the second nozzles 294B in the spray pattern (e.g., cone, hollow cone, fan, etc.), orifice size, achievable droplet size, shear capacity, pressure capacity, or volume capacity (e.g., 0.25 gallons per minute) to accommodate a different one of adulticide, larvicide, or barrier repellant. For example, the nozzles 294A, 294B may be ConeJet TX8, TX10, TX12, TXVK12, TXR80VK nozzles or the like. Such nozzles 294A, 294B may be hollow cone nozzles made of an acetal-ceramic material, have a spray angle of 80 degrees, and operate within the range of 40 to 90 PSI. Additionally, the nozzles 294A, 294B may have a flow rate of 0.17, 0.19, 0.20, 0.22, 0.23, or 0.25 gallons per minute or alternatively within the range of 0.1, 0.15, 0.2, 0.25, 0.3, 0.4, 0.5, 0.6, 0.8, 1.0, 1.5, or 2.0 gallons per minute.

In operation of the embodiment of FIG. 7, the tank 226 may be filled with a first fluid such as a larvicide. The pump 286 (driven by a motor; not shown) draws the first fluid from the low-pressure line 282 into the upstream high-pressure line 290A. The adjustable valve 260 is actuated by the controller 264 to a desired open/closed percentage dependent upon the speed of the vehicle (FIG. 2) to allow more or less fluid from the upstream high-pressure line 290A to the downstream line 290B, thereby modifying the volumetric flow rate and regulated pressure of the fluid supplied to the manifold 298. The fluid within the downstream line 290B reaches the manifold 298 where it is dispersed to the valves 276. When using the first fluid, the valves 276 direct the fluid to the first nozzles 294A. The position of the valves 276 may be automatically set by the controller 264 (e.g., in response to a manual input from a user or a sensor input to detect the type of fluid in the tank 226) or manually adjusted to direct the fluid to the first nozzles 294A. The blower assembly 254 provides an airstream (indicated by arrows 280) into the discharge chute 238 (e.g., at a speed of 100-150 miles per hour) in which the nozzles 294A, 294B are located. The airstream 280 carries the atomized fluid from the nozzles 294A away from the fluid sprayer system 210 at a first volumetric flow rate, fluid pressure, and spray pattern to achieve a desired volume median diameter (i.e., droplet size) and dispersed height for the first fluid. For example, it may be desired to achieve a droplet size of less than 120 microns such that the droplets reach a height of 65-100 feet when sprayed upward by the sprayer 210, or a height equivalent to that achieved by aerial pesticide dispersion without necessitating the use of low-flying aircrafts.

Switching to a second fluid such as an adulticide or barrier repellant by replacing the first fluid within the tank 226, the pump 286 draws the second fluid into the high-pressure line 290A similar to the first fluid. Likewise, the adjustable valve 260 allows the fluid through to the manifold 298 and valves 276 similar to the first fluid. When using the second fluid, the valves 276 direct the fluid to the second nozzles 294B. The blower assembly 254 provides the airstream 280 into the discharge chute 238 to carry the atomized fluid from the nozzles 294B away from the fluid sprayer system 210 at a second volumetric flow rate, fluid pressure, and spray pattern to achieve a desired volume median diameter and dispersed height for the second fluid. For example, it may be desired to achieve a droplet size of less than 30-40 microns such that the droplets reach a height similar to that of the first fluid (e.g., 65-100 feet) to achieve similar dispersion to that of aerial pesticide applications.

Figure 8:
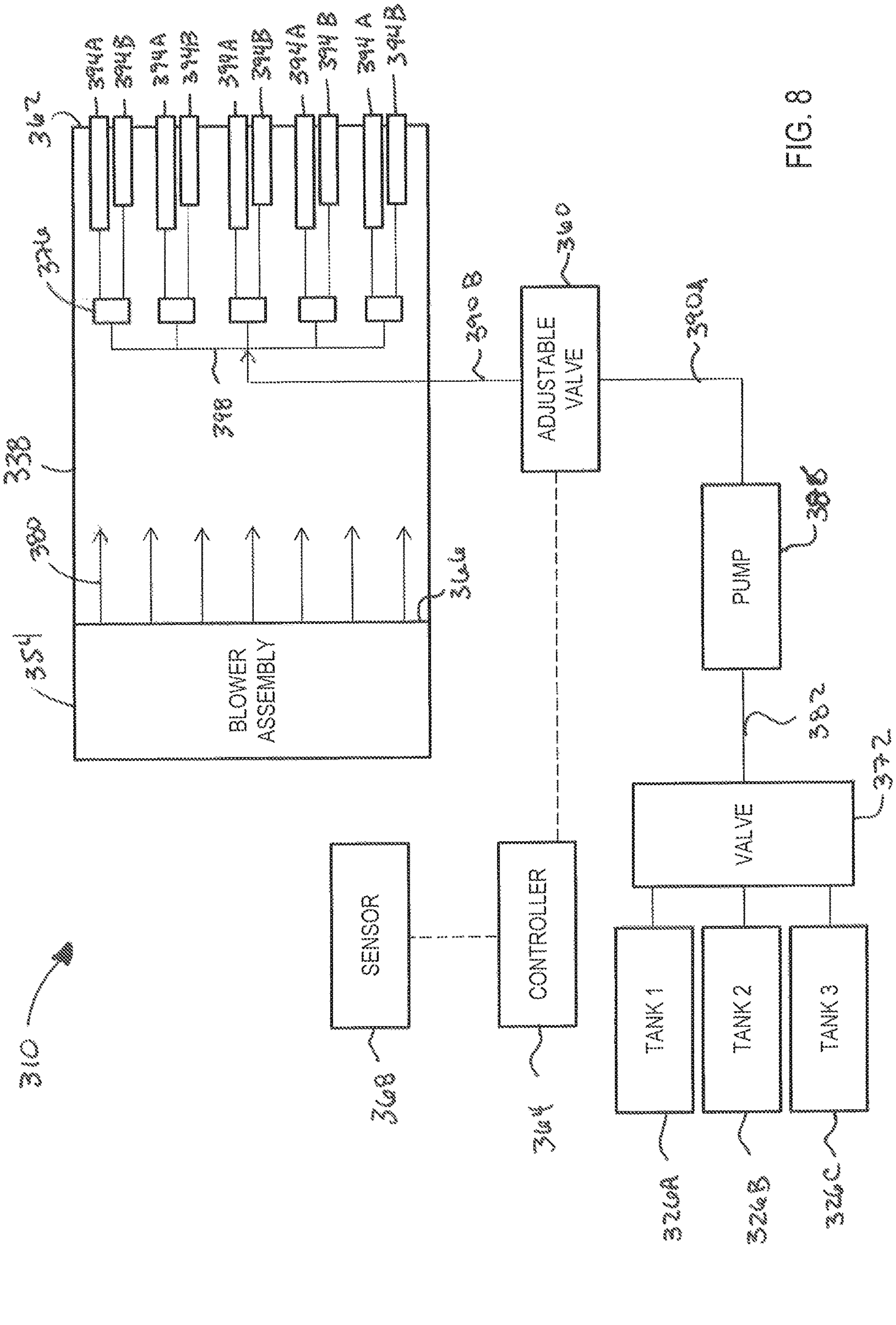
FIG. 8 is a schematic representation of a fluid sprayer in accordance with yet another embodiment of the invention.

Another fluid sprayer 310 is shown in FIG. 8 that is similar to the sprayer 210 except as otherwise described. Like elements are labeled with like reference numerals incremented by 100 (i.e., relative to the embodiment shown in FIG. 7). Although only five of each of the nozzles 394A, 394B are schematically illustrated in FIG. 8, the fluid sprayer 310 may alternatively include more or fewer of each of the nozzles 394A, 394B (e.g., seven of each of the nozzles 394A, 394B). In place of the tank 226 shown in FIG. 7, which could be emptied and refilled with different liquids (e.g., insecticides or barrier repellants), the fluid sprayer 310 includes three separate tanks 326A, 326B, 326C. The first tank 326A stores larvicide, the second tank 326B stores adulticide, and the third tank 326C stores a barrier repellant. A valve 372 is located downstream of the tanks 326A, 326B, 326C and includes three potential inlets and a single outlet to the low-pressure line 382 and pump 386. In a first position, the valve 372 connects the first tank 326A (containing larvicide) to the low-pressure line 382. In a second position, the valve 372 connects the second tank 326B (containing adulticide) to the low-pressure line 382. In a third position, the valve 372 connects the third tank 326C (containing barrier repellant) to the low-pressure line 382. The valve 372 may be actuated by a signal from the controller 364 or may be manually actuated between the three positions. Alternatively, the valve 372 may be replaced by a coupling (e.g., a quick-disconnect coupling) that is manually and alternately attachable to any one of the three tanks 326A, 326B, 326C. In this manner, the fluid sprayer 310 shown in FIG. 8 provides the capability of switching which fluid is supplied to the nozzles 394A, 394B without emptying and refilling a tank.

Figure 9:
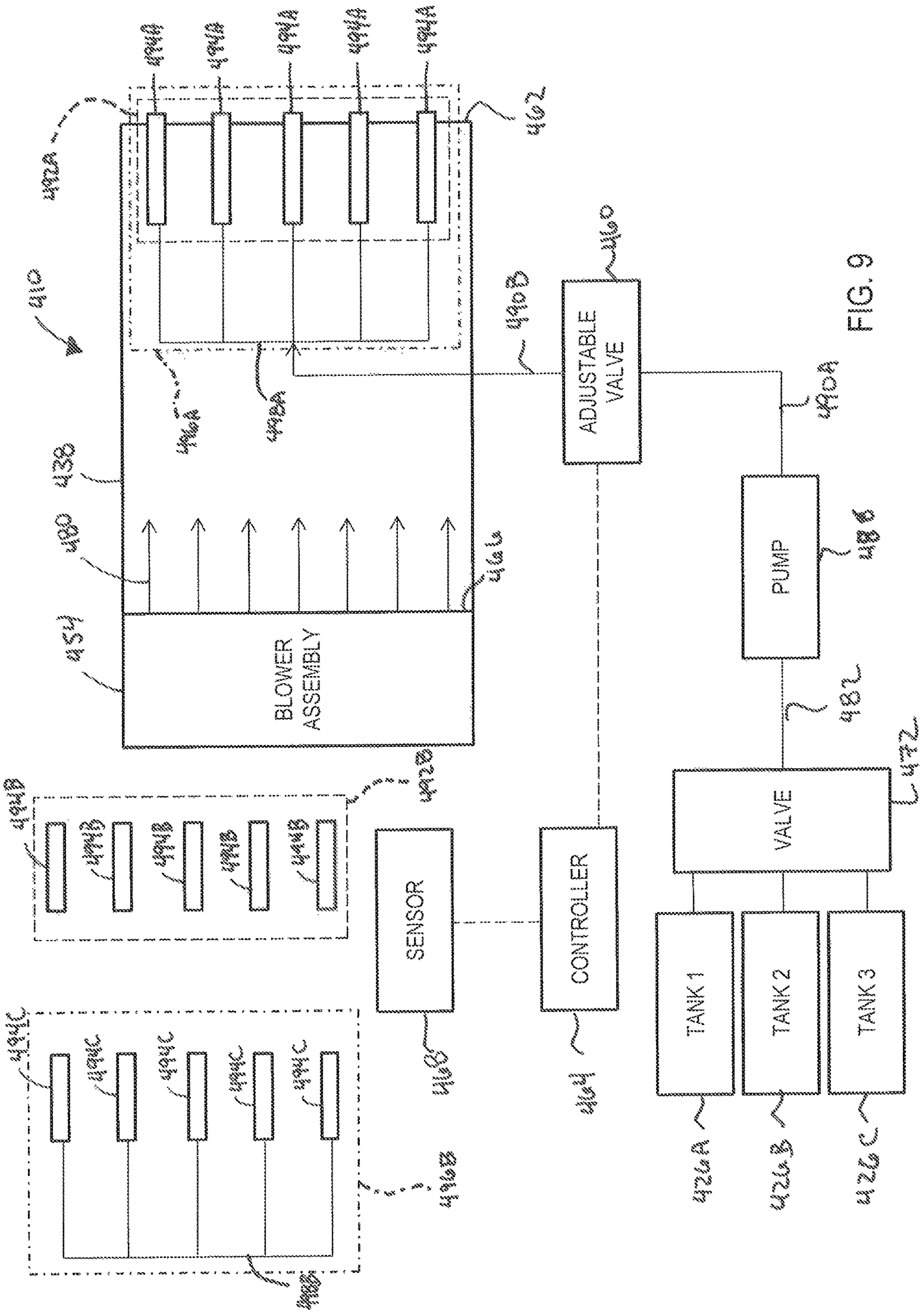
FIG. 9 is a schematic representation of a fluid sprayer in accordance with a further embodiment of the invention.

Yet another fluid sprayer 410 is shown in FIG. 9 that is similar to the sprayers 210, 310 except as otherwise described. Like elements are labeled with like reference numerals incremented by 100 (i.e., relative to the embodiment shown in FIG. 8). Although only five of each of the nozzles 494A, 494B, 494C are schematically illustrated in FIG. 9, the fluid sprayer 410 may alternatively include more or fewer of each of the nozzles 494A, 494B, 494C (e.g., seven of each of the nozzles 494A, 494B, 494C). In contrast to the fluid sprayer 310 shown in FIG. 8, the fluid sprayer 410 is not concurrently equipped with two sets of nozzles or the accompanying valves to direct the flow to the desired set of nozzles. Instead, the sprayer 410 is provided with a first set 492A of removable nozzles 494A that are physically detachable from the manifold 498A, and replaceable with a second set 492B of removable nozzles 494B. As noted above, a rotary spray nozzle (not shown) may be attached to the downstream line 490B in lieu of either of the first or second nozzle sets 492A, 492B.

Alternatively, the nozzles 494A may be permanently fixed to the manifold 498A (thereby defining a manifold assembly 496A), and the manifold assembly 496A may be removably coupled to the downstream high-pressure line 490B (e.g., using a quick-disconnect coupling). The manifold assembly 496A may be physically disconnected from the high-pressure line 490B and replaced with a second manifold assembly 496B including a second manifold 498B fixed to and providing a fluid path to a third set of nozzles 494C. The nozzles 494C may differ from the nozzles 494A, 494B in the spray pattern (e.g., cone, hollow cone, fan, etc.), orifice size, achievable droplet size, shear capacity, pressure capacity, or volumetric flow rate to accommodate a different one of adulticide, larvicide, or barrier repellant.

Therefore, any of the sprayers 210, 310, 410 shown in FIGS. 7-9 can be quickly reconfigured for spraying different types of insecticides (e.g., larvicides and adulticides) or barrier repellants, each of which must be applied to an affected area with different droplet sizes to maximize effectiveness. In particular, different operating parameters of the sprayers 210, 310, 410 may be varied (e.g., regulated pressure or volumetric flow rate of the fluid) to achieve desired droplet sizes of the sprayed fluid. Or, the number and/or types of nozzles used with the sprayers 210, 310, 410 may be quickly interchanged to vary other parameters (e.g., spray pattern, volumetric flow rate, etc.) to achieve desired droplet sizes of the sprayed fluid. In sum, each of the sprayers 210, 310, 410 is a "three-in-one" unit capable of applying effective amounts and droplet sizes of different types of insecticides (e.g., larvicides and adulticides) or barrier repellants, replacing the separate sprayers that are currently commercially available for applying these fluids.

Figure 10:
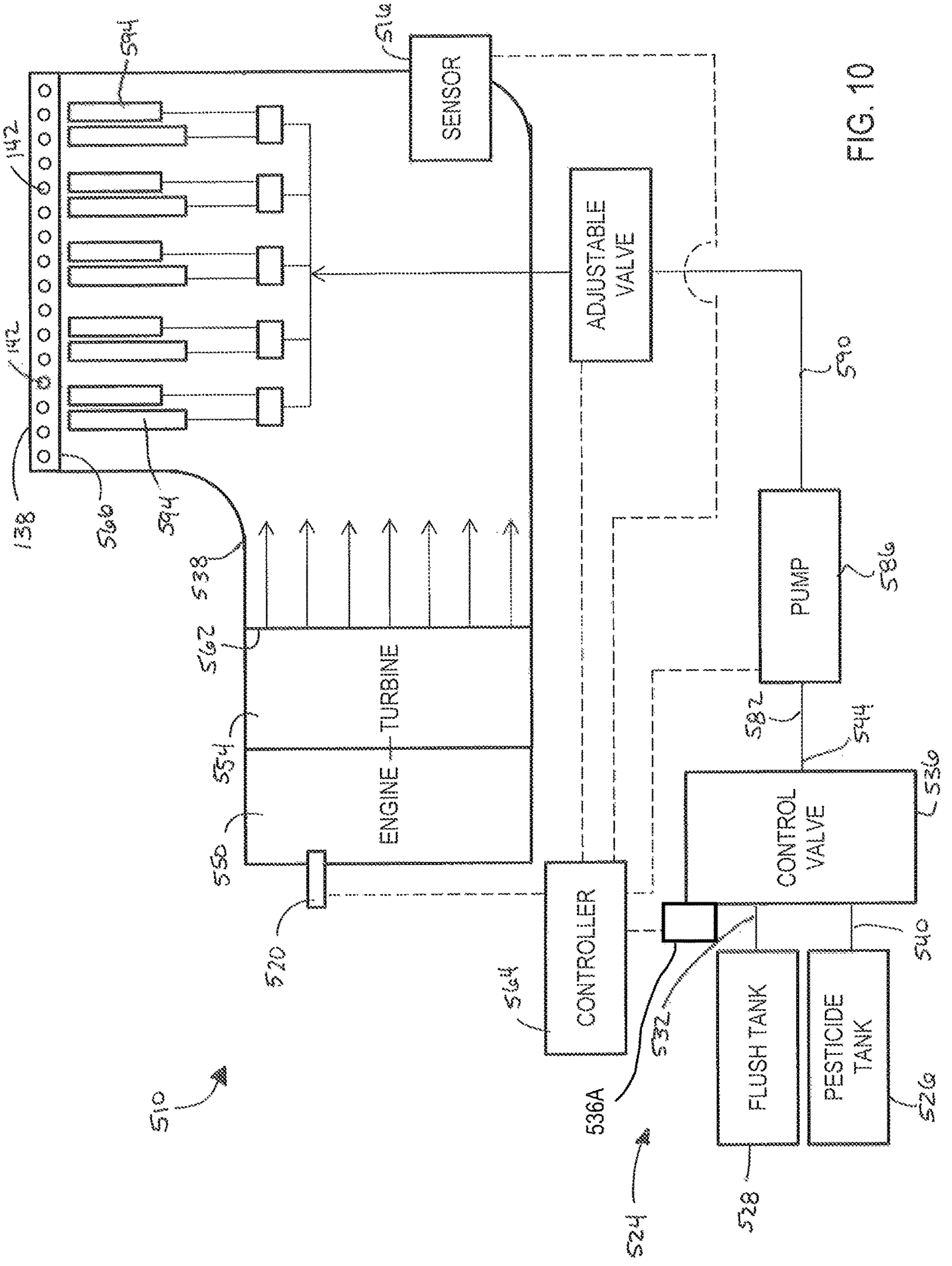
FIG. 10 is a schematic representation of a fluid sprayer including an engine and a flush system.

FIG. 10 illustrates an alternative embodiment of a fluid sprayer 510. Like elements are labeled with like reference numerals incremented by 300 (i.e., relative to the embodiment shown in FIG. 7). As shown in FIG. 10, a pressure sensor 516 is located within the chute 538 (e.g., at the elbow bend of the chute 538, between the upstream end 562 and the downstream end 566, etc.). The pressure sensor 516 detects the pressure in the chute 538 and sends a corresponding signal to the controller 564 which, in turn, monitors the detected pressure in the chute 538 (e.g., 0.5 PSIG, 1.0 PSIG, etc.). The pressure in the chute 538 is directly proportional to the speed of the airflow created by the turbine 554 exiting the chute 538. The chute 538, as shown in FIG. 10, is identical to the chutes 238, 338, 438 shown in FIGS. 7-9, and is only modified schematically in FIG. 10 to illustrate a placement of the pressure sensor 516.

The engine 550 that drives the turbine 554 is additionally controlled via the controller 564. The engine 550 is provided with a control input 520 such as a choke solenoid and/or a remote start/stop switch. The controller 564 is operable to send a signal to the control input 520 to start, stop, adjust the choke, or adjust the rotational speed of the engine 550. For example, upon system start-up, the controller 564 may actuate the control input 520 to choke the engine (if cold) and start the engine 550. The controller 564 then analyzes the output of the pressure sensor 516 and determines whether the detected pressure in the chute 538 exceeds a predetermined minimum pressure. When the minimum pressure is achieved, the controller 564 activates the pump 586 to begin pumping the fluid to the nozzles 594 from the tank 526. The controller 564 may continue monitoring readings from the pressure sensor 516 and provide adjustments to outputs of the pump 586 or the engine 550 to counteract any fluctuations, or shut down the pump 586 if the pressure drops below the predetermined minimum value or a separate predetermined value.

As shown in FIG. 10, the fluid sprayer 510 further includes a flush system 524 for cleaning the fluid sprayer 510. The flush system 524 includes a flush tank 528, a supply line 532, and a control valve 536. The flush tank 528 is a fluid tank fixed to the third sub-frame assembly 42C (FIG. 2) within the bed 46 of the vehicle and is sized to hold, for example, seven gallons of water. The flush tank 528 may contain alternative or additional fluids (e.g., cleaning solutions, etc.). The flush tank 528 is removable from the frame 42 and is refillable. The supply line 532 extends from the tank 528 to the control valve 536. In the illustrated embodiment of FIG. 10, the control valve 536 is a three-way, two-position valve 536 having dual inlet ports corresponding to the inlet lines 532, 540, respectively, and a single port corresponding to an outlet line 544. The control valve 536 is adjustable between two positions: a first position in which the first inlet 540 is in fluid communication with the outlet 544 and a second position in which the second inlet 532 is in fluid communication with the outlet 540. The control valve 536 is internally biased to the first position by a spring, for example. In the first position, the control valve 536 directs insecticide from the tank 526 to the pump 586, which discharges the insecticide under pressure through the lines 582, 590 and nozzles 594. In the second position, the control valve 536 directs water from the flush tank 528 to the pump 586, which discharges the water under pressure through the lines 582, 590 and nozzles 594. Therefore, the fluid sprayer 510 is capable of transitioning between spraying pressurized insecticide and pressurized water through the nozzles 594.

An electrical actuator 536A of the control valve 536 may be controlled via the controller 564 to switch the position of the control valve 536. For example, depressing a button on the controller 564 or within the operator cabin or on a wireless device may transition the fluid sprayer 510 from a mode of normal operation to a flush mode. In the flush mode, the controller 564 actuates (e.g., electrically) the control valve 536 to switch from the first position to the second position, and hold the second position for a predetermined time (e.g., 90 seconds). During this predetermined time, the pump 586 is provided with water from the flush tank 528 and supply line 532. The pump 586 discharges the pressurized water through the high-pressure line 590 and the nozzles 594, thereby cleaning the pump 586, lines 582, 590, and nozzles 594. When the predetermined time has passed, the controller 564 deactivates the pump 586 and terminates a control signal to the valve 536, allowing the valve 536 to return to the biased first position. During the flush mode, the engine 550 may optionally be operated to drive the turbine 554 and create the airflow through the chute 538, discharging a mist of diluted insecticide, which over time transitions to substantially water, from the chute 538.

Figure 11:
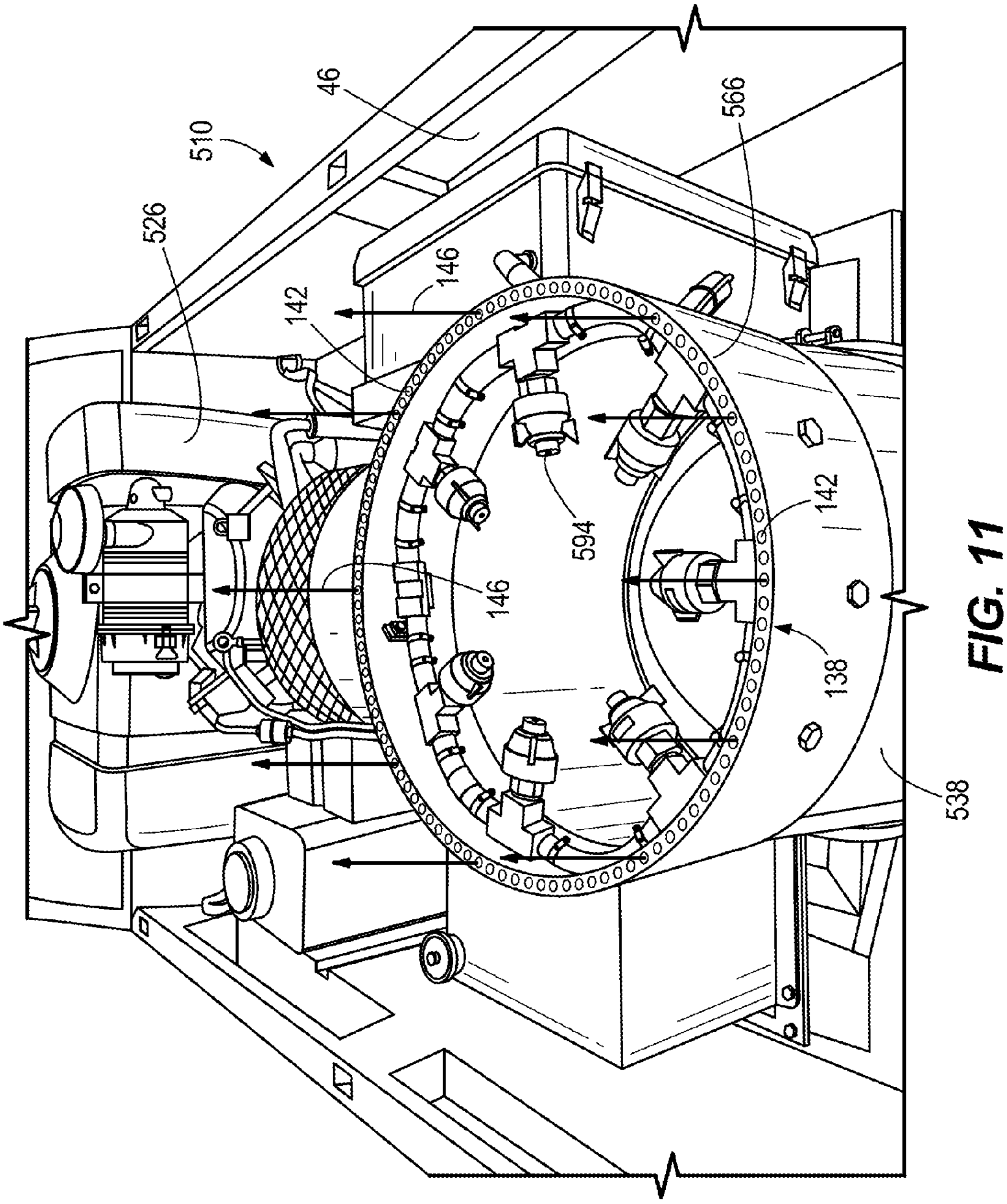
FIG. 11 illustrates a light ring of a fluid sprayer.

As shown in FIG. 11, a light ring 138 may be fixed to or around the downstream end 566 of the chute 538. The light ring 138 produces light, directed perpendicular to the circular cross-section of the chute 538 and parallel with the outlet spray, as indicated by arrows 146. As shown, the light ring 138 is composed of a plurality of individual LEDs 142 in an LED string. The light ring 138 is utilized at night to illuminate the spray as it leaves the nozzles 594 and the chute 538. Therefore, the vehicle operator (and/or the operator of the fluid sprayer 510) is able to determine whether the insecticide is being sprayed, which may indicate that the tank 526 is empty. Further, utilizing the light ring 138 at night allows the operator to monitor the spray to visually determine whether the fluid sprayer is providing an appropriate volume output. Therefore, an operator may be able to identify if, for example, one or more of the nozzles 594 are blocked or malfunctioning. Alternatively, the light ring 138 may not be circuitous, but may be formed of distinct and discontinuous light elements. Further, the light ring 138 may be mounted at an alternative location, such as within the chute 538 or at a position around the chute 538 and offset from the downstream end 566. The light ring 138 may be manually switched between an on state and an off state, either via a switch within the bed of the vehicle, or remotely (e.g., within the cab of the vehicle). Alternatively, the light ring 138 may automatically transition between the on state and the off state in response to a change in brightness or light intensity (e.g., via a photovoltaic sensor) as determined by the controller 564.

Figure 12:
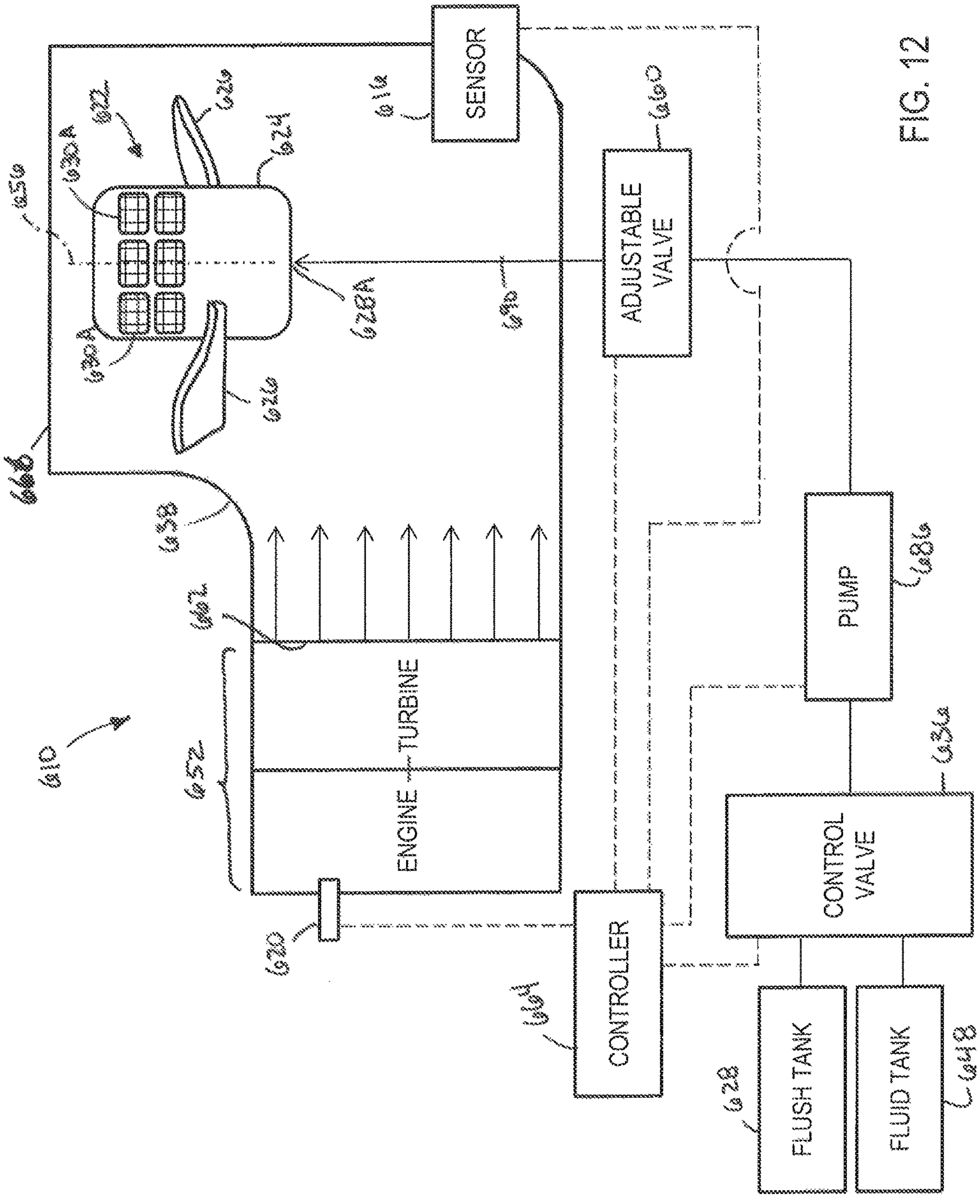
FIG. 12 illustrates a schematic representation of a fluid sprayer including a rotary atomizer.
Figure 13:
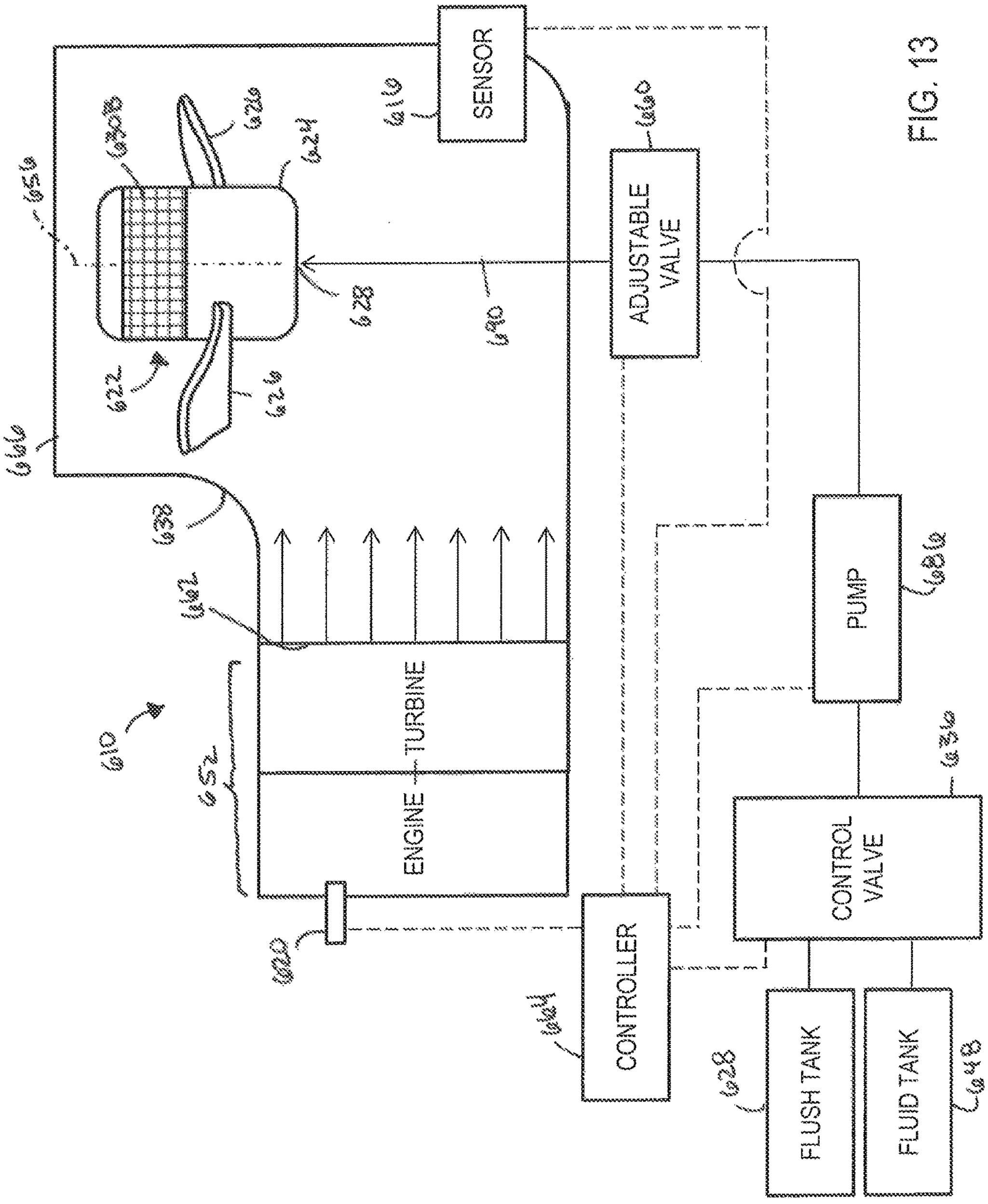
FIG. 13 illustrates a schematic representation of a fluid sprayer including an alternative rotary atomizer.

FIGS. 12-13 illustrate an alternative embodiment of a fluid sprayer 610. Like elements are labeled with like reference numerals incremented by 100 (i.e., relative to the embodiment shown in FIG. 10), except as otherwise described. As shown, the nozzle assembly 22 of the fluid sprayer 10 may be replaced with a rotary atomizer 622 such as a Pro-Mist rotary atomizer available from Clarke Mosquito Control Products, Inc. of St. Charles, Ill. or a Micronair AU4000, AU5000, AU7000, or AU6539 rotary atomizer available from the Micron Group of Bromyard, England. The rotary atomizer 622 is located within the discharge chute 638 at or adjacent the downstream end 666 of the chute 638. The atomizer 622 includes a central housing 624 and a plurality of fan blades 626. As shown, the central housing 624 is generally cylindrical, and rotates about an axis 656 perpendicular to the circular cross-section of the housing 624. This axis 656 may be parallel to or aligned with a central axis of the discharge chute 638, or more particularly, a central axis of the downstream end 666 of the discharge chute 638.

The central housing 624 includes an inlet 628A into which the fluid (e.g., a pesticide such as an adulticide, larvicide, barrier repellant, etc.) is fed from the fluid tank 648. The central housing 624 further includes a plurality of outlets 630A, (or a single outlet 630B, as shown in FIG. 13) located about a periphery of the housing 624 for discharging the fluid from the housing 624. As shown, the outlets 630A, 630B (or another location within the interior of the central housing 624) may include a gauze or mesh to control the droplet size of the fluid through the outlets 630A, 630B. The fan blades 626 are mounted to the exterior of the housing 624 at even intervals about the axis 656. For example, three blades 626 may be mounted at 120 degree intervals, four blades 626 may be mounted at 90 degree intervals, or five blades 626 may be mounted at 72 degree intervals. The blades 626 are mounted to the housing 624 at a location upstream of the outlets 630A, 630B (i.e., between the blower assembly 652 and the outlets 630A, 630B).

In operation, fluid is fed from the fluid tank 648 to the rotary atomizer 622 at a rate dictated by and controlled by the adjustable valve 660. The valve 660 may be controlled, as described above, via user input, or in response to a controller 664, taking into account various environmental and material factors (i.e., vehicle speed, desired droplet size, desired spray range, material properties of the fluid, etc.). Concurrently, the blower assembly 652 generates an air stream through the chute 638 and out the downstream end 666 of the chute 638. As the air stream passes the rotary atomizer 622, the air stream impacts the fan blades 626, thereby rotating the housing 624. Fluid line outlets (not shown) within the housing 624 remain stationary, even when the housing 624 rotates. The fluid line outlets disperse fluid from the valve 660 into the housing 624. As the rotational velocity of the rotary atomizer 622 increases, centrifugal forces acting on the fluid within the housing 624 of the atomizer 622 move the fluid through the outlets 630A, 630B and into the airstream within the chute 638. The density of the mesh or gauze within the housing 624 of the atomizer 622, along with the rotational velocity of the atomizer 622, and the volumetric rate of the fluid through the adjustable valve 660 control the overall droplet size of the atomized fluid. The atomized fluid is expelled through the downstream end 666 of the chute 638.

Figure 14:
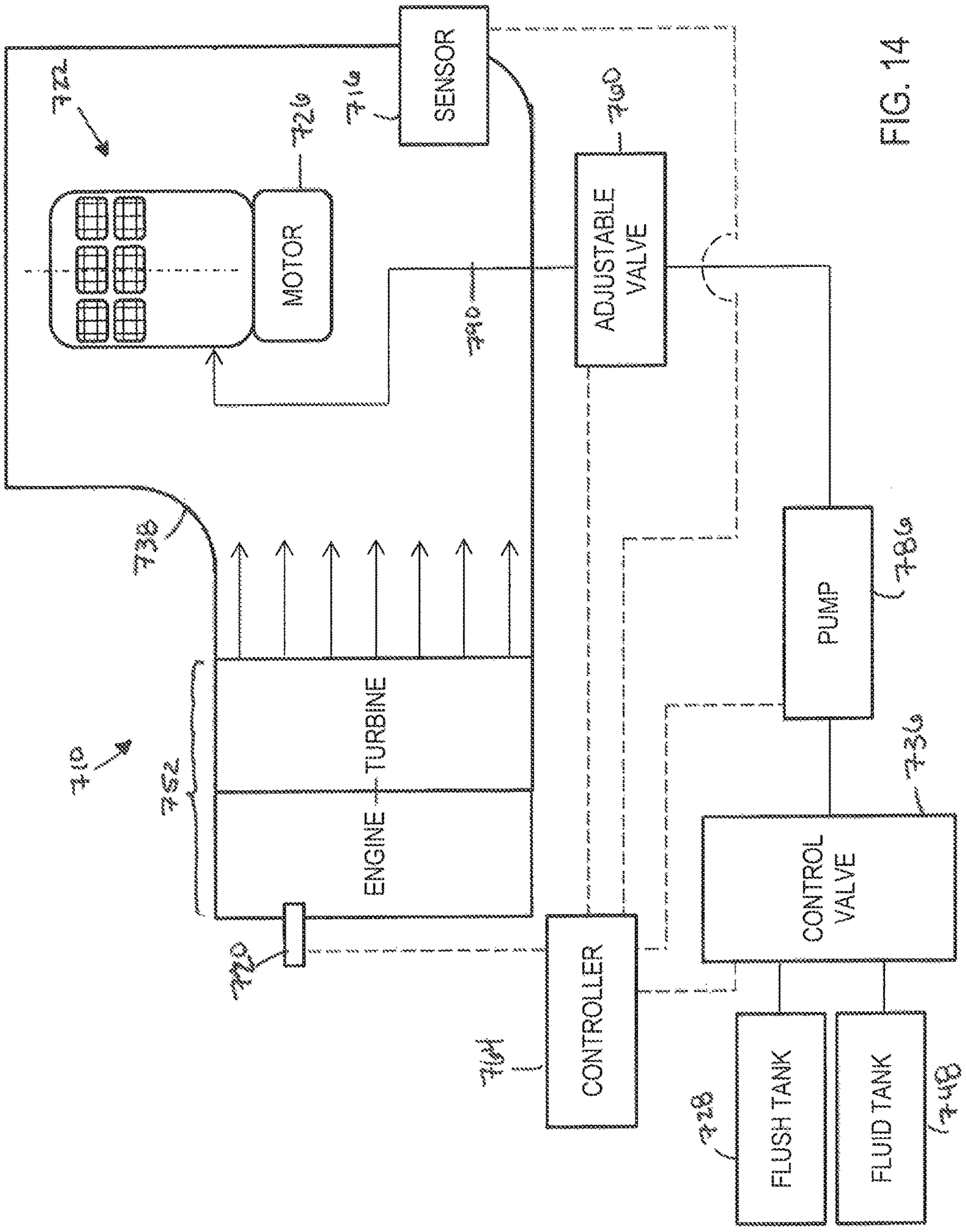
FIG. 14 illustrates a schematic representation of a fluid sprayer including yet another rotary atomizer.

FIG. 14 illustrates an alternative embodiment of a fluid sprayer 710. Like elements are labeled with like reference numerals incremented by 100 (i.e., relative to the embodiment shown in FIG. 12), except as otherwise described. A rotary atomizer 722 may be powered by an electric motor 726 to rotate the atomizer 722, replacing the fan blades 626 shown in FIGS. 12-13. The motor 726 is controllable (similar to the adjustable valve 760) by user input or by a controller 764 to rotate the atomizer 722 at various speeds and at various times to control when the fluid is expelled from the atomizer 722 and the size of the droplets that are expelled. Additional embodiments of rotary atomizers 1022, 1022*a* are shown in FIGS. 16-22 and are explained in greater detail below.

The rotary atomizers 622, 722 shown in FIGS. 12-14 are removably mounted to the chute 638, 738 similar to the nozzle assemblies 22, 122, such that an operator is able to close off the supply line 690, 790 (e.g., at the adjustable valve 660, 760) and remove one rotary atomizer 622, 722 or nozzle assembly 22, 122, and replace it with another rotary atomizer 622, 722 or nozzle assembly 22, 122. The mounting hardware may be similar to allow a plug-and-play style replacement.

A user may replace an atomizer 622, 722 or nozzle assembly 22, 122 based on the fluid used in that application, to modify the droplet size of the fluid, or to modify the controllability of the system. With reference to FIGS. 12-13, without modifying the air speed from the blower assembly 652 or the flow rate of the fluid through the adjustable valve 660, the rotational velocity of the atomizer 622, and therefore the droplet size of the fluid can be modified by changing the pitch, size, or shape of the fan blades 626 or by modifying the density of the mesh. Therefore, the user may replace one rotary atomizer 622 with another rotary atomizer 622 to modify the droplet size. If the user desires additional controllability, the user may replace the rotary atomizer 622 with the rotary atomizer 722.

The fluid sprayers 10, 210, 310, 410, 510, 610, 710 outlined above are adjustable to allow a user to replace the nozzle assemblies 22, 122 and atomizers 622, 722 when desired so that the system is capable of four different spraying functions: traditional larviciding, urban larviciding, adulticiding, and liquid barrier applications.

Traditional larviciding necessitates directed spraying of the fluid at, for example, rural roadside ditches or ponds to control the likely breeding locations of the larvae. In contrast, urban larviciding is impeded by fences and buildings that prevent controlled and directed spraying. Therefore, urban larviciding benefits from greater (e.g., higher) displacement of the fluid, achieved via small droplet sizes so that the wind is able to carry the droplets over fences and to areas that are otherwise hidden and unreachable via traditional larviciding.

Liquid barrier applications require the fluid be atomized to a first droplet size (or range), adulticiding applications require a second droplet size (or range), less than the first droplet size, traditional larviciding requires a third droplet size (or range; e.g., 100-200 microns) less than the second droplet size, and urban larviciding requires a fourth droplet size (or range; e.g., 40-120 microns) less than the third droplet size. In order to accommodate the large range of droplet sizes required to facilitate all four types of applications, the fluid sprayers 10, 210, 310, 410, 510, 610, 710 are reconfigurable to switch out which nozzle assembly 22, 122 or rotary atomizer 622, 722 is in use.

Figure 15:
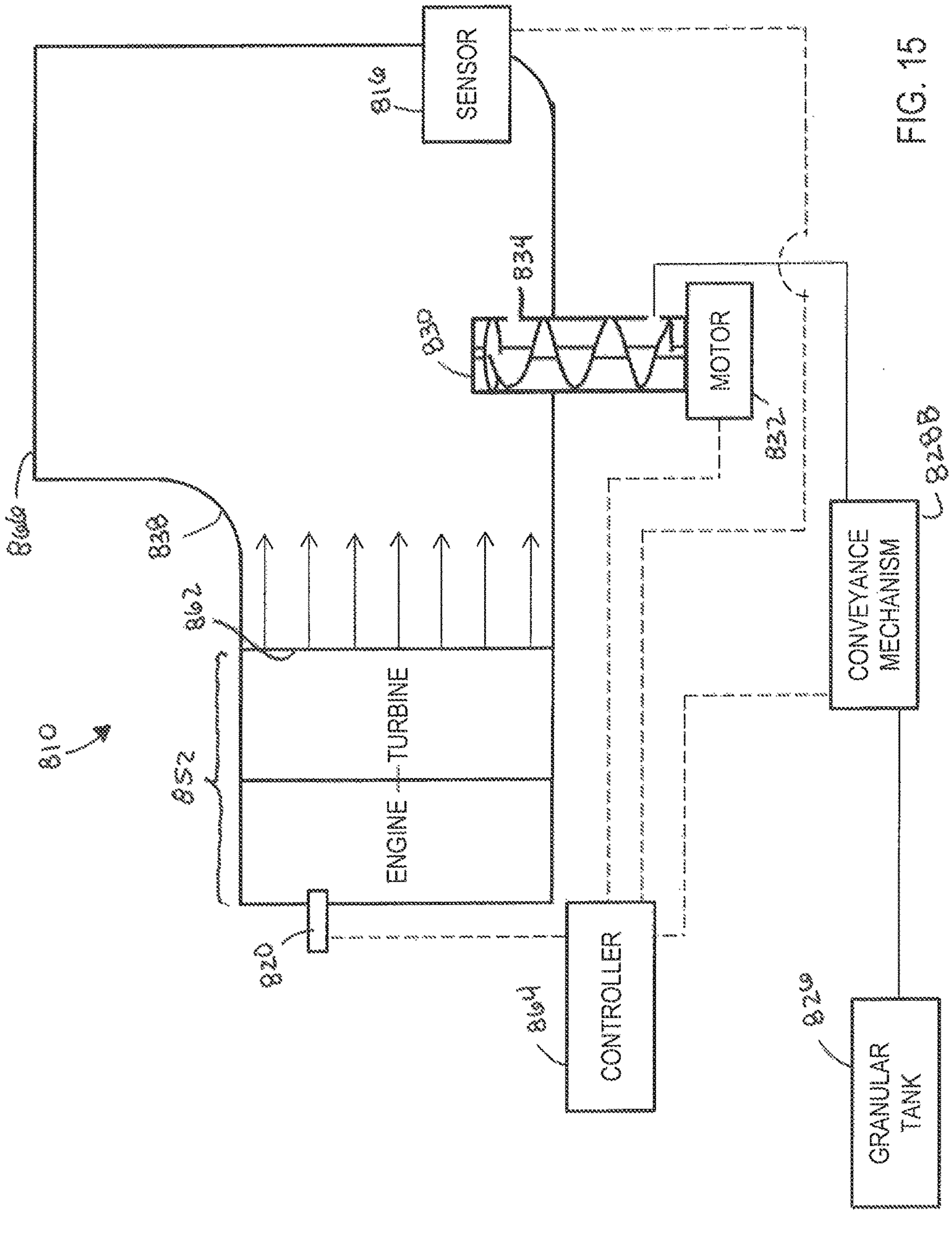
FIG. 15 illustrates a schematic representation of a sprayer for granular pesticide.

FIG. 15 illustrates an alternative embodiment of a sprayer 810. Like elements are labeled with like reference numerals incremented by 100 (i.e., relative to the embodiment shown in FIG. 14), except as otherwise described. The sprayer 810 is configured to expel granular pesticide such as granular larvicide, granular adulticide, and granular barrier repellent. A granular container 826 is loadable by a user and is configured to store an amount of granular pesticide. A conveyance mechanism 828B is utilized to move the granular pesticide from the container 826 to an auger 830. The conveyance mechanism 828B may be a pump or an additional auger. Alternatively, though schematically shown below the discharge chute 838, the container 826 may be located at a height above the chute 838 and the conveyance mechanism 828B may be gravity. The auger 830 is rotated by a motor 832 to move the granular pesticide through an opening 834 and into the chute 838. Once within the chute 838, the air stream generated by the blower assembly 852 discharges the granular pesticide out the downstream end 866 of the chute 838. Similar to the adjustable valve 260 (FIG. 7), the rotational speed of the motor 832, and therefore the auger 830, may be adjustable either manually or using an electronic controller 864. As such, the volumetric flow rate of the granular pesticide into the chute 838 can be adjusted. Alternatively (yet still similar to the adjustable valve 260), the rotational speed of the auger 830 may be controlled in response to a speed of the vehicle to maintain a consistent spray coverage. Further still, the auger 830 may be replaced with a valve, such as the adjustable valve 260.

The granular container 826, conveyance means 828B, auger 830, and motor 832 of the sprayer 810 may be implemented on a fluid sprayer 10, 110, 210, 310, 410, 510, 610, 710 such that a single system is capable of five different spraying functions: traditional directed larviciding, vertically-oriented urban larviciding, adulticiding, granular pesticiding, and liquid barrier applications.

Figure 16:
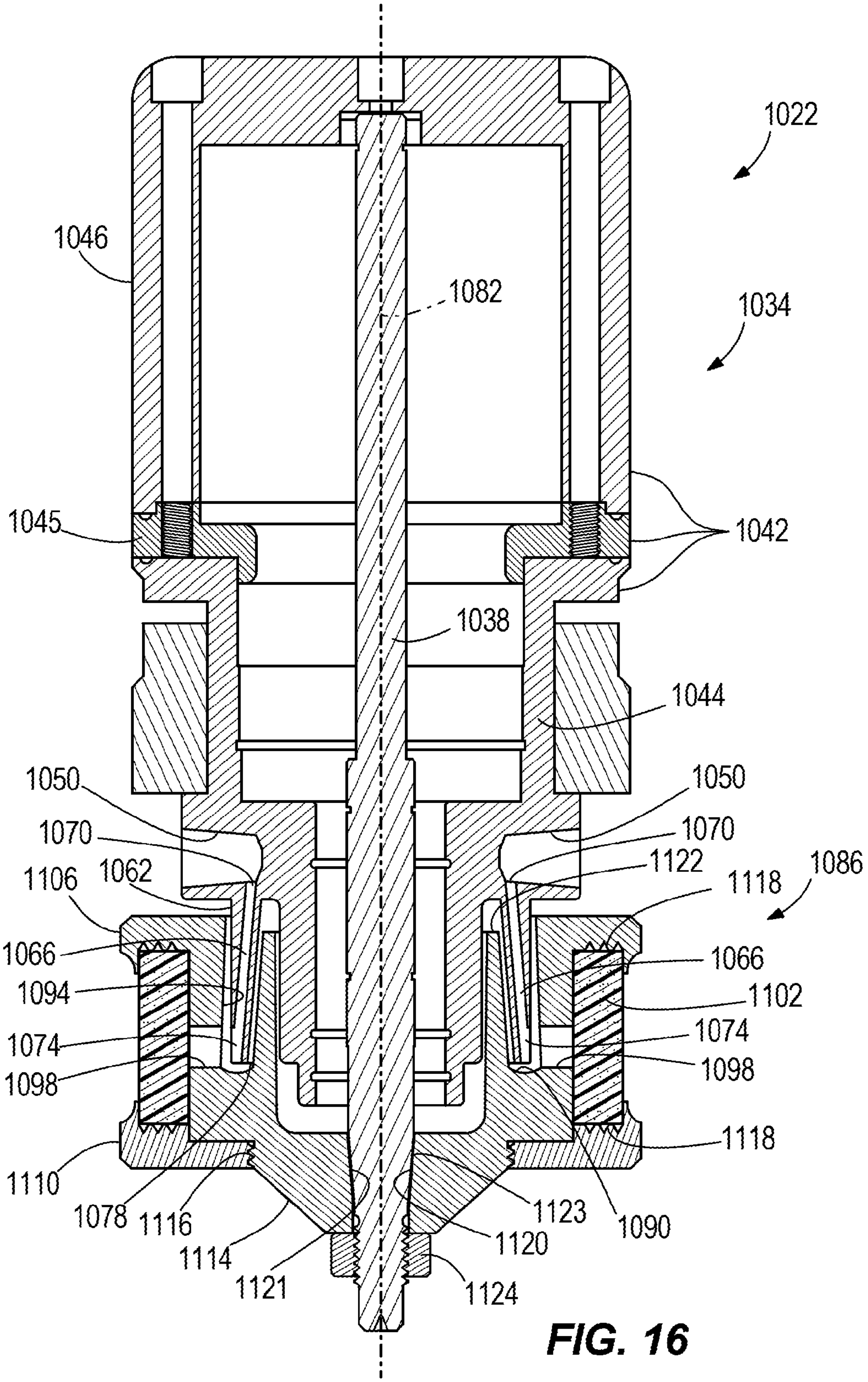
FIG. 16 is a cross-sectional view through a rotary spray head assembly for use in the fluid sprayer of FIG. 14.

FIG. 16 of the drawings illustrates a rotary spray head assembly 1022, which is a rotary atomizer and may be used in the fluid sprayer 710 of FIG. 14 in place of the rotary atomizer 722. Like the rotary atomizer 722, the rotary spray head assembly 1022 would be in fluid communication with the tank 748 of FIG. 14 via the supply line 790 to receive fluid therefrom and atomize the fluid. Further description regarding the structure and operation of the fluid sprayer is contained below.

With reference to FIG. 16, the rotary spray head assembly 1022 includes a motor 1034 having an output shaft 1038 and a multi-piece housing 1042 through which the output shaft 1038 at least partially extends. In the illustrated construction of the rotary spray head assembly 1022, the multi-piece housing 1042 includes a front housing portion 1044, an intermediate housing portion 1045, and a rear housing portion 1046 that are attached to each other by fasteners (not shown). The front and rear housing portions 1044, 1046 support respective bearings for rotatably supporting the front and rear of the output shaft 1038. Although not shown, one or more seals (e.g., O-rings) may be positioned between adjacent portions of the multi-piece housing 1042 to inhibit leakage of fluid through the interface between the respective housing portions 1044, 1045, 1046.

The front housing portion 1044 includes first and second inlets 1050 that are communicable with a source of fluid (e.g., insecticide contained in the tank 748). Particularly, each of the inlets 1050 is a threaded bore to which a fluid fitting (not shown) is attached which, in turn, is connected to the supply line 790 (FIG. 14) to receive fluid therefrom. With reference to FIG. 16, the front housing portion 1044 includes an annular skirt 1062 extending therefrom, and first and second passageways 1066 through the skirt 1062 each having a first end 1070 in fluid communication with the respective first and second inlets 1050 of the front housing portion 1044. The first and second passageways 1066 also each include a second end 1074 disposed proximate a rim 1078 on the skirt 1062 and facing radially outwardly. Each of the passageways 66 is oriented generally in the direction of a longitudinal axis 1082 of the output shaft 1038. As such, fluid passing through the passageways 1066 passes along the output shaft 1038 in generally the same direction and is discharged from the second ends 1074 of the respective passageways 1066 radially outwardly and substantially normal to the longitudinal axis 1082.

In the illustrated construction of the rotary spray head assembly 1022, the skirt 1062 includes a diverging tapered shape relative to the longitudinal axis 1082 of the output shaft 1038. In other words, the skirt 1062 flares or tapers radially outwardly as the skirt 1062 extends farther away from the front housing portion 1044 in the direction of the longitudinal axis 1082. Alternatively, the skirt 1062 may include a converging tapered shape or the skirt 1062 may be non-tapered (i.e., straight or tubular).

With continued reference to FIG. 16, the first and second passageways 1066 are formed in a common plane passing through the skirt 1062 and the longitudinal axis 1082 of the output shaft 1038. In other words, the inlets 1050 and the respective passageways 1066 are positioned 180 degrees opposite one another. Alternatively, the rotary spray head assembly 1022 may include only a single inlet 1050 and corresponding passageway 1066, or more than two inlets 1050 and corresponding passageways 1066. Furthermore, the rotary spray head assembly 1022 may include only a single inlet 1050 and multiple passageways 1066 each having a first end 1070 in fluid communication with the single inlet 1050.

The rotary spray head assembly 1022 further includes a hub 1086 coupled for co-rotation with the output shaft 1038 about the longitudinal axis 1082. The hub 1086 includes an annular groove 1090 into which the annular skirt 1062 at least partially extends, a circumferential interior surface 1094 at least partially defining the groove 1090, and radially extending apertures 1098 through the circumferential interior surface 1094 (only two of which are shown in FIG. 16; see also FIG. 17). As will be described in more detail below, fluid introduced into the annular groove 1090 through the second ends 1074 of the respective passageways 1066 is discharged radially outwardly through the apertures 1098.

Figure 17:
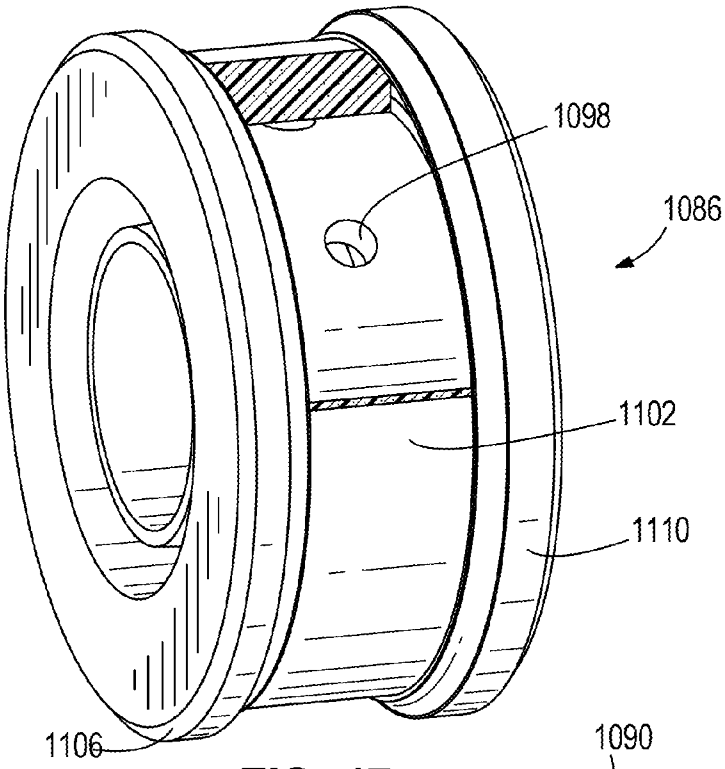
FIG. 17 is a side view of a portion of the rotary spray head assembly of FIG. 16, illustrating a partial cutaway of a porous sleeve of the rotary spray head assembly.

The rotary spray head assembly 1022 also includes a porous sleeve 1102 coupled to the hub 1086 and positioned radially outwardly of the apertures 1098 for atomizing the fluid discharged from the apertures 1098 (FIGS. 16 and 17). In particular, the sleeve 1102 is made of a polymer (e.g., ultra-high molecular weight polyethylene, high-density polyethylene, etc.) having pores with a nominal 10 micron diameter. As such, fluid passing through the sleeve 1102 as a result of centrifugal force acting on the fluid is atomized to droplets having a nominal 10 micron diameter. Alternatively, the droplets dispersed by the rotary spray head assembly 1022 may have a nominal diameter between about 5 microns and about 50 microns, depending upon the particular pore size of the sleeve 1102. As a further alternative, the sleeve 1102 may include a different pore size depending upon the fluid being used with the rotary spray head assembly 1022 and the rotational speed of the hub 1086.

With continued reference to FIGS. 16 and 17, the hub 1086 includes inboard and outboard flanges 1106, 1110 between which the sleeve 1102 is secured. Particularly, the inboard flange 1106 is integrally formed with the portion of the hub 1086 defining the annular groove 1090 and a central mounting portion 1114 of the hub 1086, while the outboard flange 1110 is coupled to the central mounting portion 1114 of the hub 1086 using a left-handed threaded connection 1116 (FIG. 16). As such, the sleeve 1102 may be removed from the hub 1086 by unthreading the outboard flange 1110 from the central mounting portion 1114 of the hub 1086 to access the sleeve 1102. Each of the flanges 1106, 1110 includes a series of concentric circular ridges 1118 in contact with the sleeve 1102 to increase the frictional force exerted on the sleeve 1102 to inhibit relative rotation between the sleeve 1102 and the hub 1086. Alternatively, the ridges 1118 may be replaced with a knurled surface on each of the flanges 1106, 1110.

With continued reference to FIG. 16, the central mounting portion 1114 of the hub 1086 includes an aperture 1120 through which the output shaft 1038 extends. The aperture 1120 includes an internal tapered surface 1121, and the output shaft 1038 includes an external, corresponding tapered surface 1123 to permit the hub 1086 to be press-fit to the output shaft 1038. A nut 1124 is threaded to a threaded portion 1125 of the output shaft 1038 to maintain the press-fit of the hub 1086 to the output shaft 1038. The hub 1086 may be removed from the output shaft 1038 by removing the nut 1124 and using a pulling tool to separate the tapered surfaces 1121, 1123 of the hub 1086 and the output shaft 1038, respectively.

Figure 18:
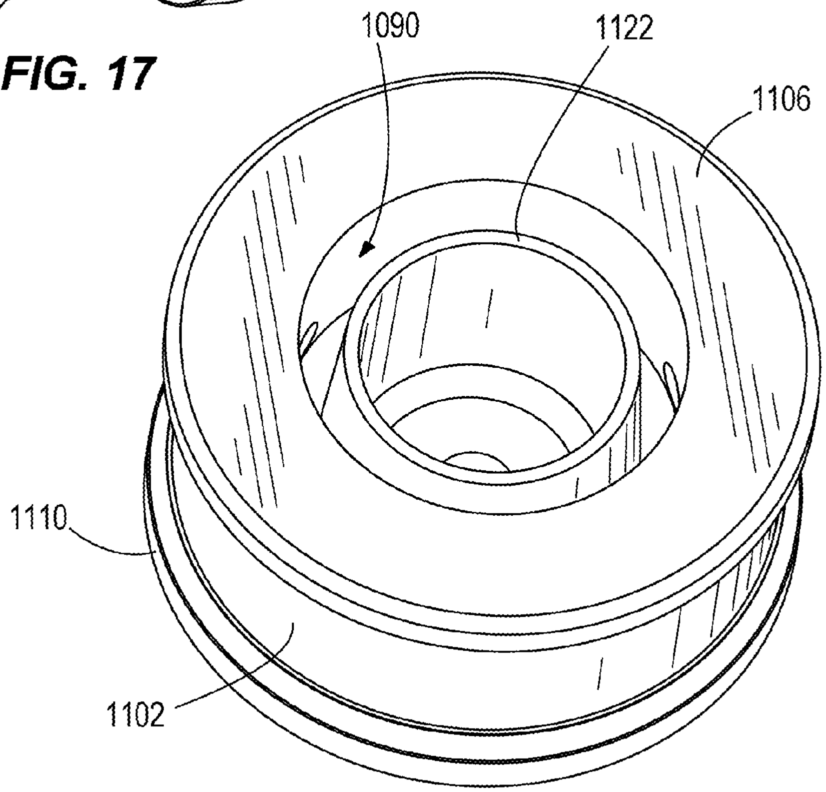
FIG. 18 is a bottom perspective view of the portion of the rotary spray head assembly shown in FIG. 17.

The hub 1086 includes an annular barrier wall 1122 at least partially defining the annular groove 1090. The barrier wall 1122 extends toward the front housing portion 1044 and surrounds the output shaft 1038. The circumferential interior surface 1094 of the hub 1086 surrounds the barrier wall 1122 and substantially defines the annular groove 1090 in conjunction with the barrier wall 1122. In other words, when the hub 1086 is removed from the remainder of the rotary spray head assembly 1022, the barrier wall 1122 and the circumferential interior surface 1094 are in facing relationship with each other (FIG. 18). As shown in FIG. 16, the skirt 1062 and the barrier wall 1122 axially overlap such that a combination of the skirt 1062 and the barrier wall 1122 defines a tortuous path between the annular grove 1090 and the output shaft 1038, thereby inhibiting fluid in the annular groove 1090 from migrating radially inwardly toward the output shaft 1038. As a result, the output shaft 1038 is exposed to less fluid over the lifetime of the rotary spray head assembly 1022, reducing the amount of fluid intrusion that might otherwise occur along the output shaft 1038 and into the multi-piece housing 1042, which includes electronic components that facilitate operation of the motor 1034.

With continued reference to FIG. 16, the second ends 1074 of the respective passageways 1066 are in facing relationship with the circumferential interior surface 1094 of the hub 1086. As such, in operation of the rotary spray head assembly 1022, fluid is introduced to the rotary spray head assembly 1022 through the inlets 1050 and is subsequently discharged from the second ends 1074 of the respective passageways 1066 against the circumferential interior surface 1094. The hub 1086 is rotated by the motor 1034 at a high rate of speed (e.g., 30,000 revolutions per minute). Consequently, centrifugal force acting on the fluid causes it to spread out over the circumferential length of the interior surface 1094 and form a thin film over the circumferential interior surface 1094. Some of the fluid, however, may directly pass through one or more of the apertures 1098 depending upon the position of the one or more apertures 1098 as they rotate past the second ends 1074 of the respective passageways 1066. The fluid accumulated as the thin film is then flung radially outwardly through the apertures 1098 by centrifugal force, where it impacts the interior of the porous sleeve 1102. Centrifugal force continues to act on the fluid, causing it to move through the pores in the sleeve 1102. The fluid is then discharged from the porous sleeve 1102 in a radial direction, substantially perpendicular to the direction of the wind thrust 118 flowing around the assembly 1022, as atomized droplets into the discharge chute 738 for dispersion throughout the surroundings of the fluid sprayer 710.

Figure 19:
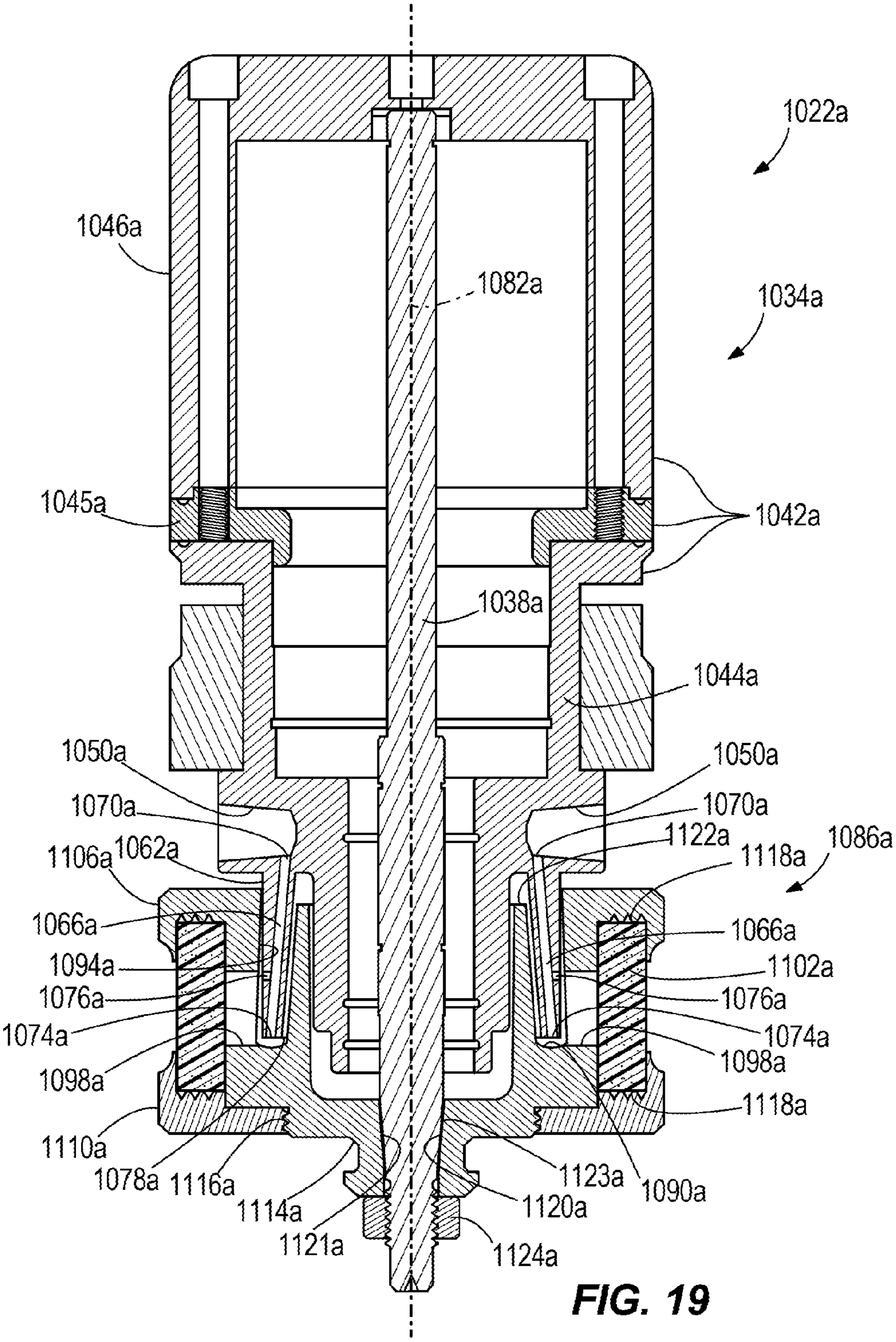
FIG. 19 is a cross-sectional view through another embodiment of a rotary spray head assembly for use with the fluid sprayer of FIG. 14.
Figure 20:
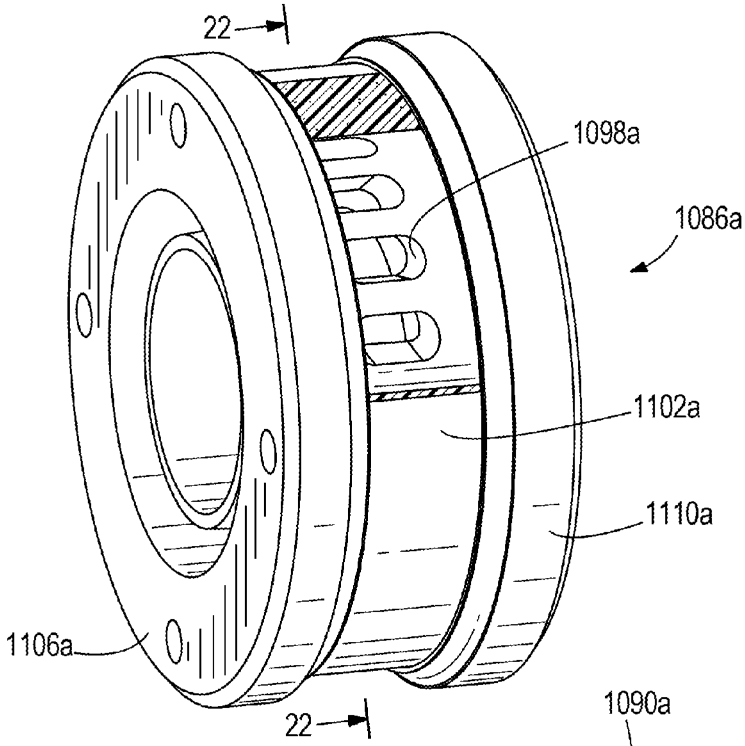
FIG. 20 is a side view of a portion of the rotary spray head assembly of FIG. 19, illustrating a partial cutaway of a porous sleeve of the rotary spray head assembly.
Figure 21:
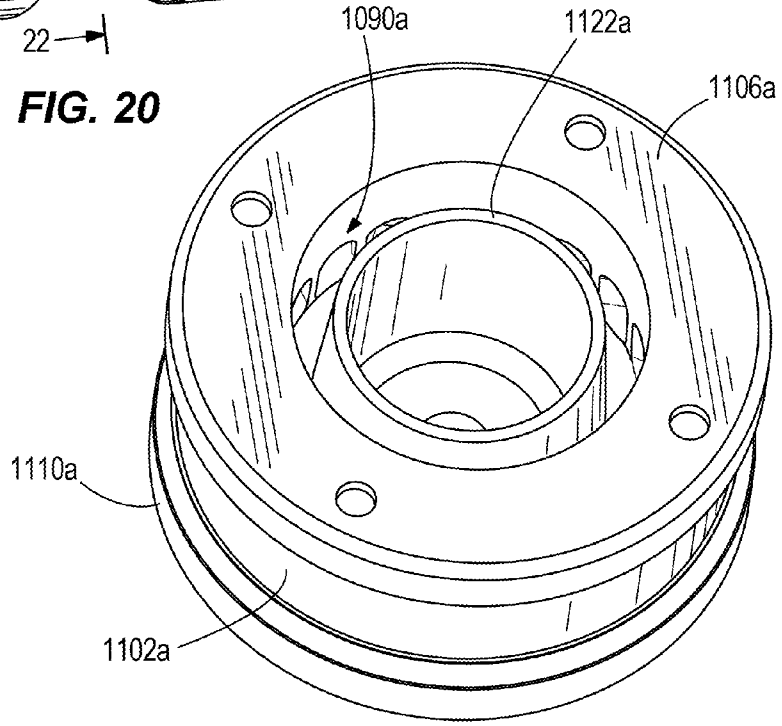
FIG. 21 is a bottom perspective view of the portion of the rotary spray head assembly shown in FIG. 20.

Another embodiment of a rotary spray head assembly 1022*a* is shown in FIG. 19, with like components being identified with like reference numerals with the letter "a." Rather than including radially extending apertures such as those in the hub 1086, the hub 1086*a* includes apertures 1098*a* extending through the circumferential interior surface 1094*a* (only two of which are shown in FIG. 19; see also FIGS. 20 and 22) that are canted or inclined relative to a plane containing the longitudinal axis 1082*a* (FIG. 19). Additionally, the apertures 1098*a* include an oblong shape, with a major axis extending in a direction parallel with the longitudinal axis 1082*a*.

Figure 22:
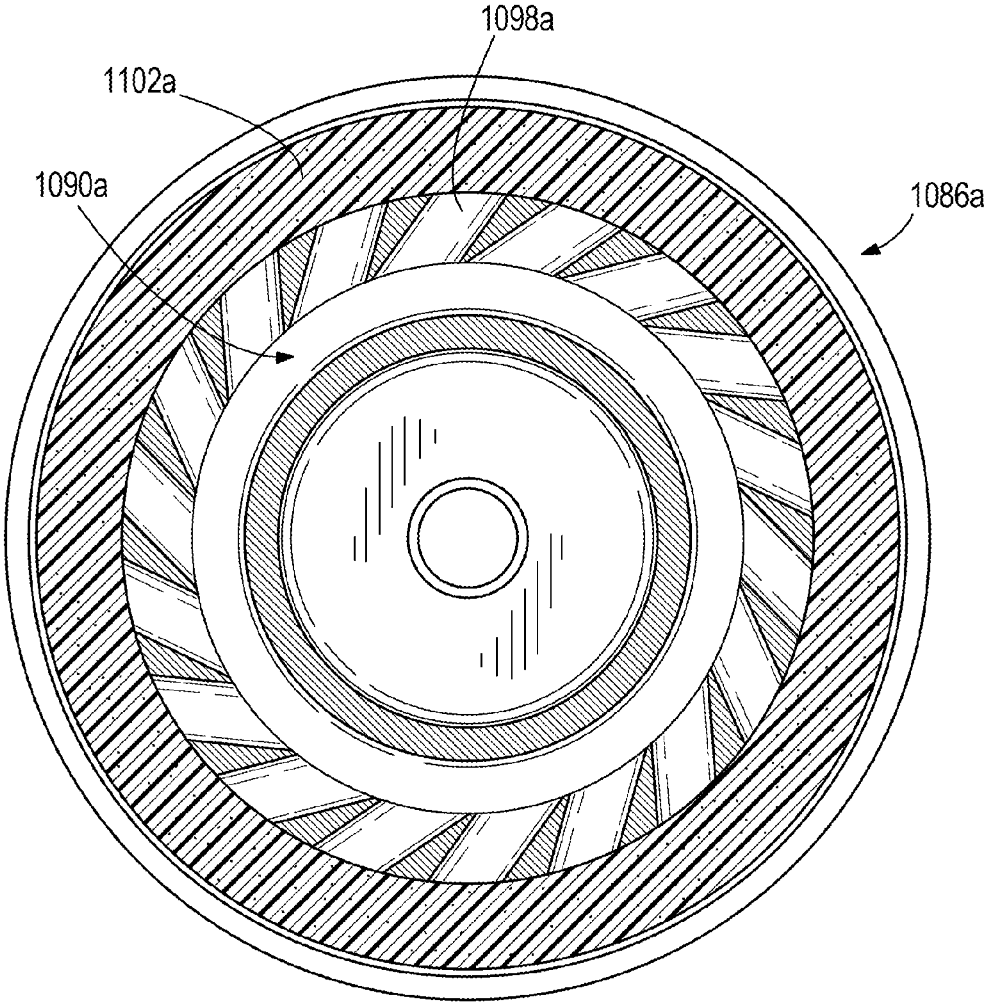
FIG. 22 is a cross-sectional view of the portion of the rotary spray head assembly shown in FIG. 20, taken along line 22-22 in FIG. 20.

With reference to FIG. 22, the rotary spray head assembly 1022*a* includes a plurality of intermediate apertures 1076*a* through the annular skirt 1062*a* and in fluid communication with the respective passageways 1066*a* (FIG. 19). Accordingly, in operation of the rotary spray head assembly 1022*a*, fluid is discharged from the passageways 1066*a* both through the second ends 1074*a* (and against the bottom of the annular groove 1090*a*), and the intermediate apertures 1076*a* (in a radial direction toward the apertures 1098*a*).

Various features of the invention are set forth in the following claims.

We claim:

1. A fluid sprayer comprising:

a tank containing fluid therein;

a nozzle assembly in communication with the tank to receive fluid therefrom and to atomize the fluid;

a blower assembly positioned upstream of the nozzle assembly for dispersing the atomized fluid from the nozzle assembly into the surroundings of the fluid sprayer;

a discharge chute positioned downstream of the blower assembly into which the atomized fluid from the nozzle assembly is sprayed before being discharged upward and into the surroundings of the fluid sprayer;

a pump located between the tank and the nozzle assembly;

a low pressure line configured to deliver the fluid from the tank to the pump at a first pressure;

a high pressure line configured to deliver the fluid from the pump to the nozzle assembly at a second pressure greater than the first pressure;

a valve positioned between the nozzle assembly and the pump to regulate the pressure of fluid supplied to the nozzle assembly, wherein the valve is adjustable to regulate the pressure of fluid supplied to the nozzle assembly at different values, and wherein the adjustable valve includes an electrical actuator, and wherein the fluid sprayer further comprises a controller in electrical communication with the electrical actuator and operable to vary the regulated fluid pressure by activating the electrical actuator; and a sensor operable to detect an operating condition and provide an input signal to the controller, wherein the controller is operable to adjust the valve in response to the input signal to vary the regulated pressure of the fluid supplied to the nozzle assembly, wherein the operating condition is a speed or a pressure of an airflow generated by the blower assembly.

2. The fluid sprayer of claim 1, wherein the nozzle assembly includes at least one discharge port having a discharge axis oriented substantially perpendicular to a direction of airflow exiting the discharge chute.

3. The fluid sprayer of claim 1, wherein the nozzle assembly includes a plurality of discharge ports, each having a discharge axis oriented substantially perpendicular to a direction of airflow exiting the discharge chute.

4. The fluid sprayer of claim 3, wherein the discharge chute defines a central axis parallel with the direction of airflow exiting the discharge chute, and wherein the nozzle assembly is coaxial with the central axis.

5. The fluid sprayer of claim 4, wherein the atomized fluid is discharged from the nozzle assembly in a radially outward direction away from the central axis.

6. The fluid sprayer of claim 3, wherein the discharge chute defines a central axis parallel with the direction of airflow exiting the discharge chute, and wherein the nozzle assembly is offset from the central axis.

7. The fluid sprayer of claim 6, wherein the atomized fluid is discharged from the nozzle assembly in a radially inward direction toward the central axis.

8. The fluid sprayer of claim 1, wherein the nozzle assembly includes a nozzle having a discharge axis oriented substantially perpendicular to a direction of airflow exiting the discharge chute.

9. The fluid sprayer of claim 8, wherein the discharge chute includes a first end adjacent the blower assembly and a second end opposite the first end, wherein the nozzle assembly is located between the first end and the second end.

10. The fluid sprayer of claim 9, wherein the discharge chute defines a non-linear path between the first end and the second end, wherein the discharge chute defines, proximate the second end, a high-velocity region and a low-velocity region opposite the high-velocity region, and wherein the discharge axis of the nozzle is oriented towards the high-velocity region.

11. The fluid sprayer of claim 10, wherein the nozzle is a first nozzle, wherein the nozzle assembly further comprises a plurality of additional nozzles, and wherein each of the plurality of additional nozzles has a discharge axis oriented towards the high velocity region and substantially perpendicular to the direction of airflow exiting the discharge chute.

12. The fluid sprayer of claim 1, wherein the nozzle assembly is a first nozzle assembly operable to discharge atomized fluid at a first volumetric flow rate, and wherein the fluid sprayer further comprises a second nozzle assembly operable to discharge atomized fluid at a second volumetric flow rate different than the first volumetric flow rate, wherein the first and second nozzle assemblies are interchangeable to convert the fluid sprayer for use with a first fluid selected from a group consisting of larvicide, adulticide, and a barrier repellant and a second fluid selected from the group.

13. The fluid sprayer of claim 1, wherein the nozzle assembly is a first nozzle assembly operable to discharge atomized fluid with a first spray pattern, and wherein the fluid sprayer further comprises a second nozzle assembly operable to discharge atomized fluid with a second spray pattern different than the first spray pattern, wherein the first and second nozzle assemblies are interchangeable to convert the fluid sprayer for use with a first fluid selected from a group consisting of larvicide, adulticide, and a barrier repellant and a second fluid selected from the group.

14. The fluid sprayer of claim 1, wherein the nozzle assembly comprises a manifold connectable with the tank of fluid and supportable by the discharge chute of the fluid sprayer, and a plurality of nozzles fluidly connected to the manifold to receive pressurized fluid therefrom.

15. The fluid sprayer of claim 14, wherein the plurality of nozzles is a first plurality of nozzles connectable with the manifold to receive fluid therefrom and to discharge fluid from the manifold at a first volumetric flow rate, and wherein the fluid sprayer further comprises a second plurality of nozzles connectable with the manifold to receive fluid therefrom and to discharge fluid from the manifold at a second volumetric flow rate different than the first volumetric flow rate, wherein the first and second plurality of nozzles are interchangeable with the manifold to convert the fluid sprayer for use with a first fluid selected from a group consisting of larvicide, adulticide, and a barrier repellant and a second fluid selected from the group.

16. The fluid sprayer of claim 14, wherein the plurality of nozzles is a first plurality of nozzles connectable with the manifold to receive fluid therefrom and to discharge fluid from the manifold with a first spray pattern, and wherein the fluid sprayer further comprises a second plurality of nozzles connectable with the manifold to receive fluid therefrom and to discharge fluid from the manifold with a second spray pattern different than the first spray pattern, wherein the first and second plurality of nozzles are interchangeable with the manifold to convert the fluid sprayer for use with a first fluid selected from a group consisting of larvicide, adulticide, and a barrier repellant and a second fluid selected from the group.

17. The fluid sprayer of claim 1, wherein the nozzle assembly is a rotary atomizer.

18. The fluid sprayer of claim 17, wherein the rotary atomizer comprises a housing in fluid communication with the tank to receive fluid therefrom, a shaft supported by the housing for rotation about an axis, and a hub coupled to the shaft for co-rotation therewith, the hub including a plurality of apertures extending away from the axis from which atomized fluid is discharged.

19. The fluid sprayer of claim 18, wherein the rotary atomizer includes a motor operable to rotate the shaft and the hub.

20. The fluid sprayer of claim 18, wherein the rotary atomizer includes a plurality of fan blades coupled to the hub, and wherein the fan blades are operable to impart rotation to the hub in response to an airflow generated by the blower assembly flowing around the fan blades.

21. The fluid sprayer of claim 1, wherein the operating condition is a first operating condition, further comprising a second operating condition, wherein the second operating condition is a speed of a vehicle upon which the fluid sprayer is transported.

22. The fluid sprayer of claim 1, wherein the tank is a first tank containing a fluid selected from a group consisting of larvicide, adulticide, and a barrier repellant, and wherein the fluid sprayer further comprises a second tank containing water alternately connectable with the low pressure line of the pump to flush the water in the second tank through the nozzle assembly.

23. The fluid sprayer of claim 22, further comprising a switchable multi-position valve having first and second inlets fluidly connectable with the first and second tanks, respectively, and an outlet in fluid communication with the low pressure line of the pump.

24. The fluid sprayer of claim 23, wherein the switchable multi-position valve includes an electrical actuator, and wherein the fluid sprayer further comprises a controller in electrical communication with the electrical actuator for switching the multi-position valve between a first position, in which the first inlet is fluidly connected with the outlet, and a second position, in which the second inlet is fluidly connected with the outlet.

* * * * *